United States Patent [19]

Tanaka et al.

[11] Patent Number: 5,276,580
[45] Date of Patent: Jan. 4, 1994

[54] TAPE CASSETTE INCLUDING A SPOOL LOCKING MEMBER

[75] Inventors: Masato Tanaka; Kiyotaka Yanaka, both of Tokyo, Japan

[73] Assignee: Sony Corporation, Tokyo, Japan

[21] Appl. No.: 827,933

[22] Filed: Jan. 29, 1992

[30] Foreign Application Priority Data

Feb. 1, 1991 [JP] Japan .................. 3-031362

[51] Int. Cl.$^5$ ................... G11B 23/02; G03B 1/04
[52] U.S. Cl. ..................... 360/132; 242/198; 242/199
[58] Field of Search ............ 360/132; 242/198, 199

[56] References Cited

U.S. PATENT DOCUMENTS

| | | | |
|---|---|---|---|
| 4,029,268 | 6/1977 | Schoettle et al. | 242/198 |
| 4,635,879 | 1/1987 | Sumida et al. | 242/198 |
| 4,660,784 | 4/1987 | Sumida et al. | 242/198 |
| 4,671,469 | 6/1987 | Ikebe et al. | 242/198 |
| 4,742,417 | 5/1988 | Komiyama et al. | 360/132 |
| 4,757,957 | 7/1988 | Nakatamari et al. | 242/198 |
| 4,788,614 | 11/1988 | Onmori et al. | 360/132 |
| 4,789,113 | 12/1988 | Katagiri et al. | 242/198 |
| 4,881,137 | 11/1989 | Meguro et al. | 360/132 |
| 4,926,279 | 5/1990 | Kurashina et al. | 360/132 |
| 4,961,124 | 10/1990 | Breuer et al. | 360/132 |
| 4,969,611 | 11/1990 | Katagiri et al. | 242/198 |
| 5,010,434 | 4/1991 | Schoettle et al. | 360/132 |
| 5,056,735 | 10/1991 | Gelardi et al. | 242/198 |
| 5,091,813 | 2/1992 | Ryu | 360/132 |
| 5,146,380 | 9/1992 | Fujii et al. | 360/132 |

Primary Examiner—Robert S. Tupper
Assistant Examiner—Paul J. Ditmyer
Attorney, Agent, or Firm—Lewis H. Eslinger; Jay H. Maioli

[57] ABSTRACT

A tape cassette (1) comprises a case body consisting of an upper half case (2) and a lower half case (3), a pair of spools (7,8) for winding a tape, supported for rotation within the case body and provided respectively with circumferentially arranged toothed portions ($7a_1, 8a_1$), a locking member (11) placed for sliding within the case body and provided with locking fingers ($11a_1, 11a_2$) to be brought into engagement with the front portions of the toothed portions ($7a_1, 8a_1$) of the spools (7,8), and a cam portion (11d) to be brought into engagement with the positioning pin (99) of a recording/reproducing apparatus in loading the tape cassette on the recording/reproducing apparatus, and a locking spring (11c) fastened to the locking member (11) to bias the locking member (11) toward the back side of the case body. The positioning pin (99) engages the cam portion (11d) of the locking member (11) to shift the locking member toward the front side of the case body so that the locking fingers ($11a_1, 11a_2$) are disengaged from the toothed portions ($7a_1, 8a_1$) in loading the tape cassette on the recording/reproducing apparatus. The locking spring (11c) biases the locking member (11) toward the back side of the case body so that the locking fingers ($11a_1, 11a_2$) engage the toothed portions ($7a_1, 8a_1$) of the spool (7,8) in removing the tape cassette (1) from the recording/reproducing apparatus. The locking member (11) locks the spools (7,8) firmly so that the spools are not caused to rotate even if an impact is applied to the back side of the case body.

4 Claims, 23 Drawing Sheets

F I G. 11(C)
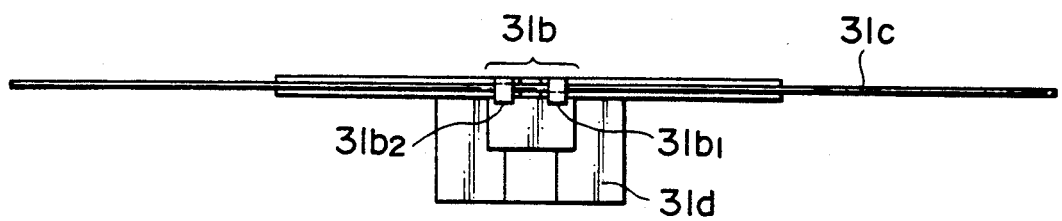
F I G. 11(D)
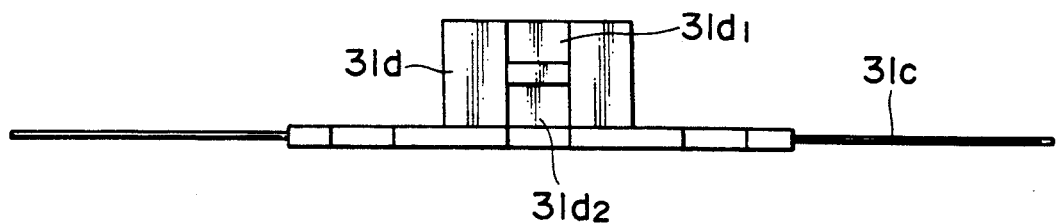

F I G. 15(A)
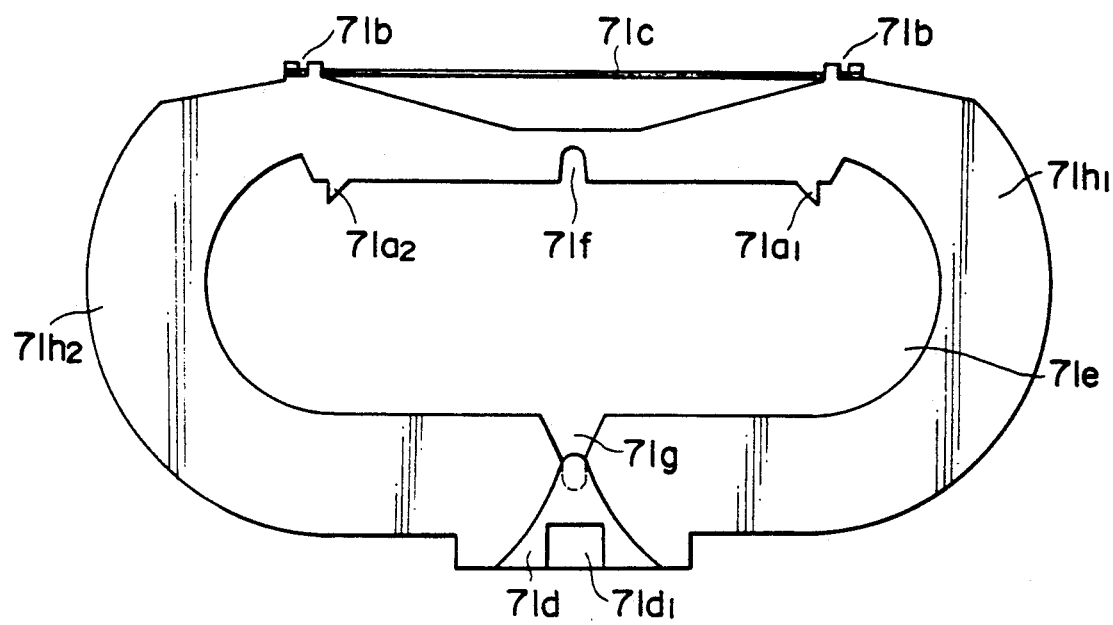
F I G. 15(B)
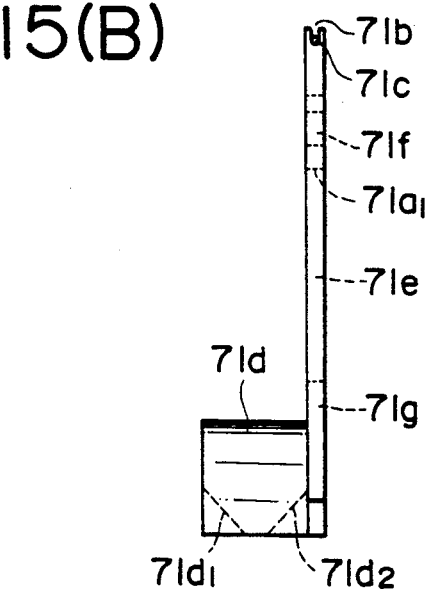
F I G. 15(C)
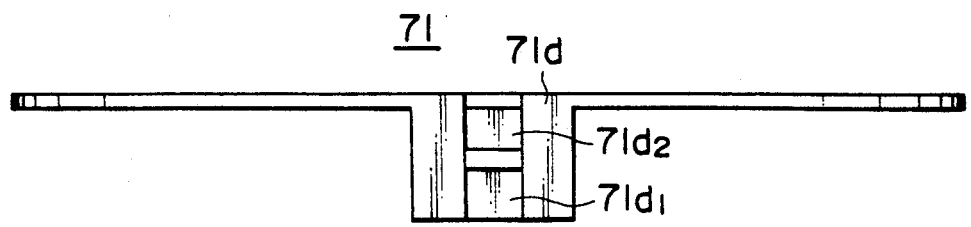

TAPE CASSETTE INCLUDING A SPOOL LOCKING MEMBER

BACKGROUND OF THE INVENTION

1. Field of the Invention

The present invention relates to a tape cassette provided with spools and a locking member for locking the spools to restrain the spools from unnecessary rotation while the tape cassette is not in use.

2. Description of the Prior Art

There have been various tape cassettes applied to practical uses for the high-density recording of video signals or PCM signals, such as ½ in. video tape cassettes and 8 mm video tape cassettes, provided with a locking mechanism for locking the spools to lock the same to prevent the magnetic tape from unwinding while the tape cassettes are not in use.

The locking mechanism locks the spools by pressing a locking member against the spools by the resilience of a spring while the tape cassette is not in use, and unlocks the spools by separating the locking member from the spools with an unlocking pin inserted from outside the case body.

A conventional spool locking mechanism will be described by way of example with reference to FIGS. 18, 19 and 20. Shown in FIGS. 18 to 20 are the case body of a tape cassette 81 consisting of an upper half case 82 and a lower half case 83, holes 84 formed in the upper half case 82 and the lower half case 83, a locking member 91 placed in the lower half case 83, and an unlocking pin 99 that engages the locking member 91 when inserted through the hole 84 in the case body of the tape cassette 81 to shift the locking member 91.

In the following description, a side of the case body of the tape cassette 81 to be placed nearer to a recording/reproducing head will be referred to as "the front side", and a side of the same to be placed farther from the recording/reproducing head will be referred to as "the back side". As best illustrated in FIG. 18 and 19, a substantially rectangular recess 90 is formed in the bottom wall of the lower half case 83 of the case body of the tape cassette 81 in the central portion of the bottom wall and near the back side of the case body of the tape cassette 81, and the locking member 91 is placed in the recess 90 so as to move toward and away from the front side, namely, toward and away from spools 87 and 88.

The locking member 91 has a flat body 91a seated on the bottom surface of the recess 90, and a vertical projection 91b standing upright from the back portion of the flat body 91a. The flat body 91a is provided with a pair of fingers $91a_1$ and $91a_2$ projected from the opposite ends of the front portion thereof so as to correspond to the spools 87 and 88, respectively.

The spool 87 (88) has an inner spool 87a (88a) which receives a spool driving shaft therethrough, and an outer spool 87b (88b) put on the inner spool 87a (88a) for axial movement relative to the inner spool 87a (88a) and restrained from rotating relative to the inner spool 87a (88a). The fingers $91a_1$ and $91a_2$ of the locking member 91 can be pressed against portions of the circumferences of the inner spools 87a and 88a projecting from the radial surfaces of the outer spools 87b and 88b, respectively.

A pair of guide slots 92a and 92b are formed in the front portion of the middle portion of the flat body 91a, and guide pins 93a and 93b project from the bottom surface of the recess 90 at positions respectively corresponding to the guide slots 92a and 92b. The guide pins 93a and 93b are received respectively in the guide slots 92a and 92b to guide the locking member 91 for movement in limited directions.

A flat spring 94 for biasing the locking member 91 is disposed behind the locking member 91. The flat spring 94 has a main body 94a, and an arm 94b formed by raising a central portion of the main body 94a. The main body 94a is fitted in a spring pocket 95 formed on the inner surface of the back wall of the lower half case 83, and the extremity of the arm 94b is received in a recess 96 formed in the back surface of the vertical projection 91b to bias the locking member 91 continuously toward the front side of the tape cassette, namely, in a direction to press the fingers $91a_1$ and $91a_2$ against the circumferences of the inner spools 87a and 88a.

The locking member 91 is provided in the central portion of the front surface of its vertical projection 91b with a triangular protrusion 97 to disengage the locking member 91 from the inner spools 87a and 88a. The triangular protrusion 97 has inclined surfaces 97a and 97b symmetrically descending in opposite directions, respectively, from the apex thereof. An unlocking pin 99 received through the hole 84 of either the upper half case 82 or the lower half case 83 into the case body engages the inclined surface 97a or 97b of the triangular protrusion 97 to unlock the spools 87 and 88 by shifting the locking member 91 toward the back side of the tape cassette.

While the tape cassette 81 is not loaded on a recording/reproducing apparatus, the fingers $91a_1$ and $91a_2$ are pressed against the circumferences of the inner spools 87a and 88a by the resilience of the flat spring 94 as shown in FIG. 20(a) and as indicated by alternate long and short dash lines in FIG. 19 to lock the spools 87 and 88, so that the spools 87 and 88 are unable to turn even if some shocks act on the tape cassette 81. When the tape cassette 81 is loaded on the recording/reproducing apparatus, the unlocking pin 99 of the recording-/reproducing apparatus enters the tape cassette 81 through the hole 84 as shown in FIG. 20(b) and shifts the locking member 91 toward the back side of the tape cassette 81 to a position indicated by continuous lines in FIG. 19 to unlock the spools 87 and 88 by separating the fingers $91a_1$ and $91a_2$ from the inner spools 87a and 88a.

This conventional locking mechanism has the following problems, which will be described hereinafter with reference to FIGS. 21 to 26.

(1) Since the locking member 91 must be shifted a distance toward the back side of the tape cassette 81 with the unlocking pin 99 received into the tape cassette 81 through the hole 84 of either the upper half case 82 or the lower half case 83 and engaging the triangular protrusion 97 of the locking member 91 to unlock the spools 87 and 88, the holes 84 must be formed outside an area of a width W (FIG. 21) corresponding to the distance by which the locking member 91 must be shifted. Consequently, an area on the surface of the tape cassette available for applying a label 89 is reduced and, if the tape cassette is a very small one, it is impossible to form the label 89 in a size sufficient to indicate all the necessary matters.

(2) The apex of the triangular protrusion 97, i.e., the junction of the inclined surfaces 97a and 97b, in contact with the unlocking pin 99 and expected to move along a course indicated by an alternate long and short dash line is pushed backward away from the course, by the unlocking pin 99, in a region indicated P in FIG. 22, when the back side of the tape cassette 81 is lifted up by the cassette holding mechanism of the recording/reproducing apparatus, in ejecting the tape cassette 81, as shown in FIG. 22, to enable the unlocking pin 99 to escape from the tape cassette 81 through the hole 84 set opposite to the recording/reproducing head of a recording/reproducing apparatus and, consequently, the locking member 91 is moved toward the back side of the tape cassette 81 beyond its normal unlocking position, which produces resistance against the movement of the tape cassette 81 in lifting up the back side of the case body to enable the locking pin 99 to escape from the tape cassette 81, thereby obstructing smooth tape cassette ejection.

(3) The locking member 91 is liable to be tilted by the frictional engagement of the unlocking pin 99 and the triangular protrusion 97 as shown in FIGS. 23(b) or 23(c), increasing the friction between the locking member 91 and the lower half case 83, because it is difficult to form the locking member 91 so that the width $L_1$ of the flat body 91a is sufficiently large as compared with the height $H_1$ of the vertical projection 91b, which obstructs smooth spool unlocking operation.

(4) The spools 87 and 88 are biased slightly toward the front side of the tape cassette 81 (in the direction of arrows $D_1$) by the pressure applied thereto by the locking member 91 in locking the spools 87 and 88 by pressing the locking member 91 against the spools 87 and 88 by the resilience of the flat spring 94 after the unlocking pin 99 has escaped from the tape cassette 81. Consequently, the tape T extending between the spools 87 and 88 is allowed to slacken, nullifying the essential spool locking action of the locking member 91.

(5) It is possible that the spools 87 and 88 are unlocked when the tape cassette 81 is rattled. For example, if external vibrations causing the spools 87 and 88 to turn in the direction of an arrow $R_1$ as shown in FIG. 25, the spool 87 pushes the locking member 91 in the direction of an arrow $D_2$ and the spool 88 pushes the locking member 91 in the direction of an arrow $D_3$, and thereby the spools 87 and 88 are unlocked. Since the spool 88 is urged in the direction of the arrow $R_1$, the tape T is unwound from the spool 88 and slackens.

The slackening of the tape T due to the rattling of the tape cassette 81 may be obviated by guiding the locking member 91 so that the locking member 91 is translated perfectly. However, when the spools 87 and 88 differ in weight from each other due to the difference between the amount of the tape T wound on the spool 87 and that of the same wound on the spool 88, the lighter one of the spools 87 and 88 is unlocked when the tape cassette 81 is rattled.

(6) The spools 87 and 88 move instantaneously toward the back side, i.e., in the direction of an arrow $D_4$, as shown in FIG. 26(a) if an impact G is applied to the back side of the tape cassette 81 and, consequently, the spools 87 and 88 are pulled by the tape T and are caused to turn respectively in the directions of arrows $R_2$ and $R_3$, and the tape T is unwound from the spools 87 and 88. Accordingly, the tape T slackens by a length pulled out from the spools 87 and 88 when the spools 87 and 88 are moved in the direction of an arrow $D_5$ to their original positions as shown in FIG. 26(b) by the locking member 91 after the impact G has been removed.

(7) The employment of the flat spring 94 in a locking member biasing means as described with reference to FIGS. 18 and 19 requires the locking member biasing means to be formed in a relatively large construction, which is disadvantageous in application of the locking member biasing means to a very small tape cassette.

Since the arm 94b of the flat spring 94 tending to spring toward the front side of the tape cassette 81 must be strained by the locking member 91 in a direction, namely, toward the back side of the tape cassette 81, opposite the direction in which the arm 94b tends to spring when installing the flat spring 94 in the lower half case 83 or when unlocking the spools 87 and 88, the stress induced in the flat spring 94 increases to cause the flat spring 94 to spring up or to tilt, thereby making the normal spool locking action of the locking member 91 impossible.

SUMMARY OF THE INVENTION

The present invention has been made in view of the foregoing problems, and it is therefore an object of the present invention to provide a tape cassette having a locking member placed so as to be brought into engagement with and to be disengaged from a pair of spools on which a magnetic tape is wound to lock and to unlock the spools, biased by a spring member toward a locking position where the locking member engages the spools, and having a cam portion with which a pin inserted through either of holes formed in the half cases of a cassette engages to shift the locking member to an unlocked position to unlock the spools against the resilience of the spring member; wherein the locking member is brought into contact with the circumferences of the spools from the front side of the tape cassette in locking the spools, and the locking member is shifted toward the front side of the tape cassette when the pin engages the cam portion to unlock the spools.

The locking member presses the pair of spools of the tape cassette from the front side of the tape cassette toward the back side of the same, namely, in a direction to tighten the tape so that the slackening of the tape can be prevented. Since the locking member is moved toward the front side of the tape cassette to unlock the spools, any additional space for the movement of the locking member need, not be formed in the back side of the tape cassette, and therefore unnecessary friction between the unlocking pin and the triangular protrusion can be obviated when ejecting the tape cassette from the recording/reproducing apparatus.

BRIEF DESCRIPTION OF THE DRAWINGS

The above and other objects, features and advantages of the present invention will become more apparent from the following description taken in connection with the accompanying drawings, in which:

FIGS. 11(a), 11(b), 11(c) and 11(d) are a front view, a sectional view taken on line C—C, a plan view and a bottom view, respectively, of a locking member employed in a tape cassette in a second embodiment according to the present invention;

FIGS. 15(a), 15(b) and 15(c) are a front view, a side view and a bottom view, respectively, of a locking member employed in a tape cassette in a fourth embodiment according to the present invention;

DESCRIPTION OF THE PREFERRED EMBODIMENTS

A tape cassette in a first embodiment according to the present invention will be described hereinafter with reference to FIGS. 1 to 10. The tape cassette 1 in the first embodiment is a very small tape cassette.

Figure 8:
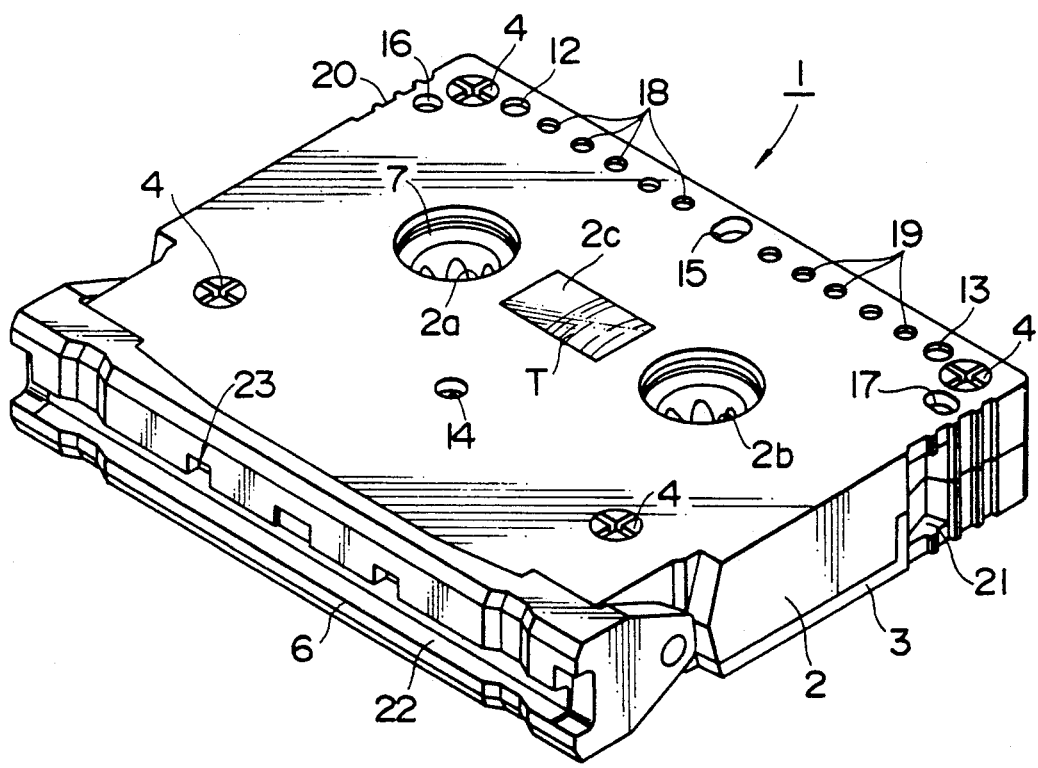
FIG. 8 is a perspective view of a tape cassette of the present invention.
Figure 9:
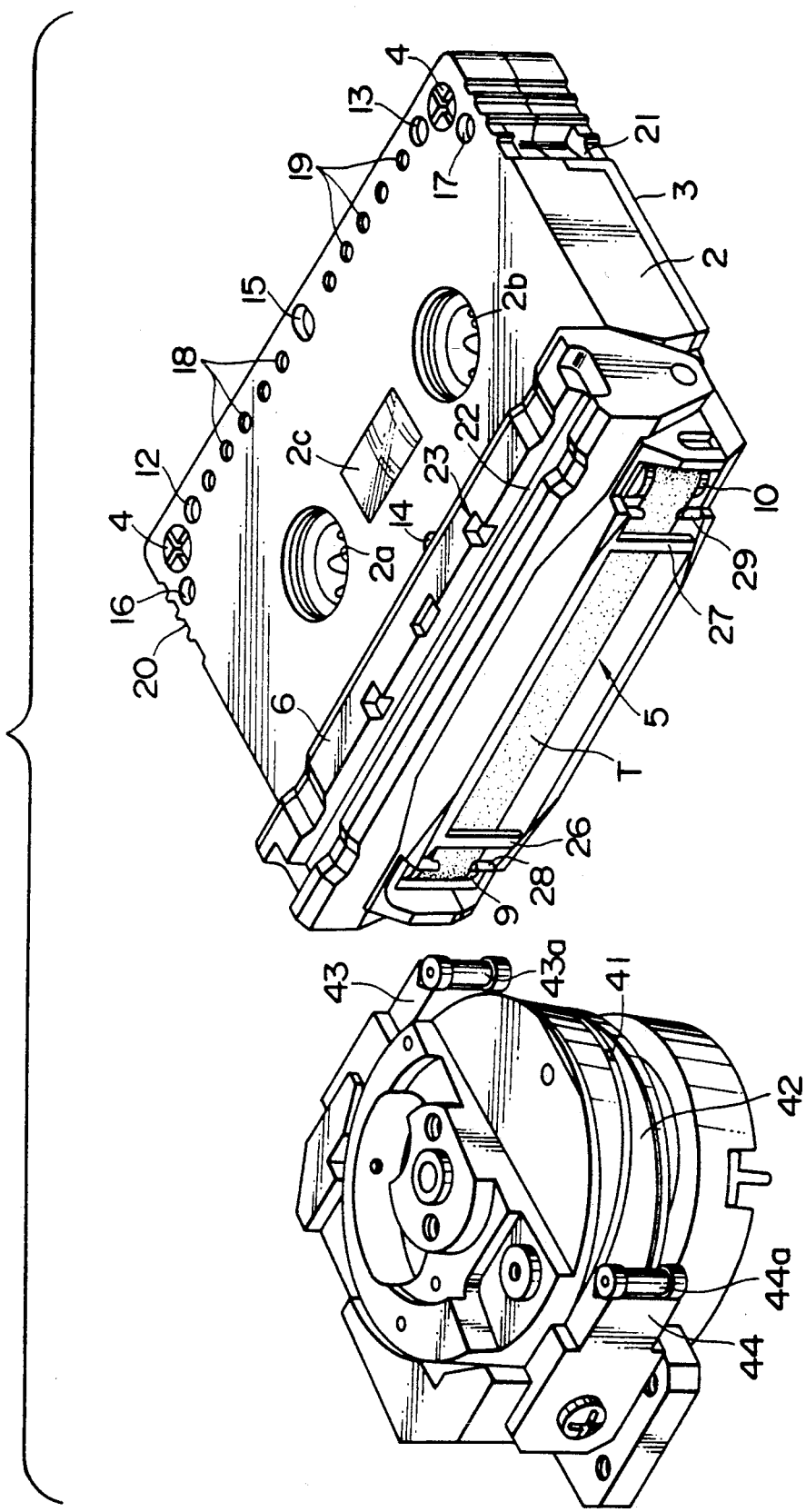
FIG. 9 is a perspective view of assistance in explaining the relation between the tape cassette of the present invention and a head drum.
Figure 10:
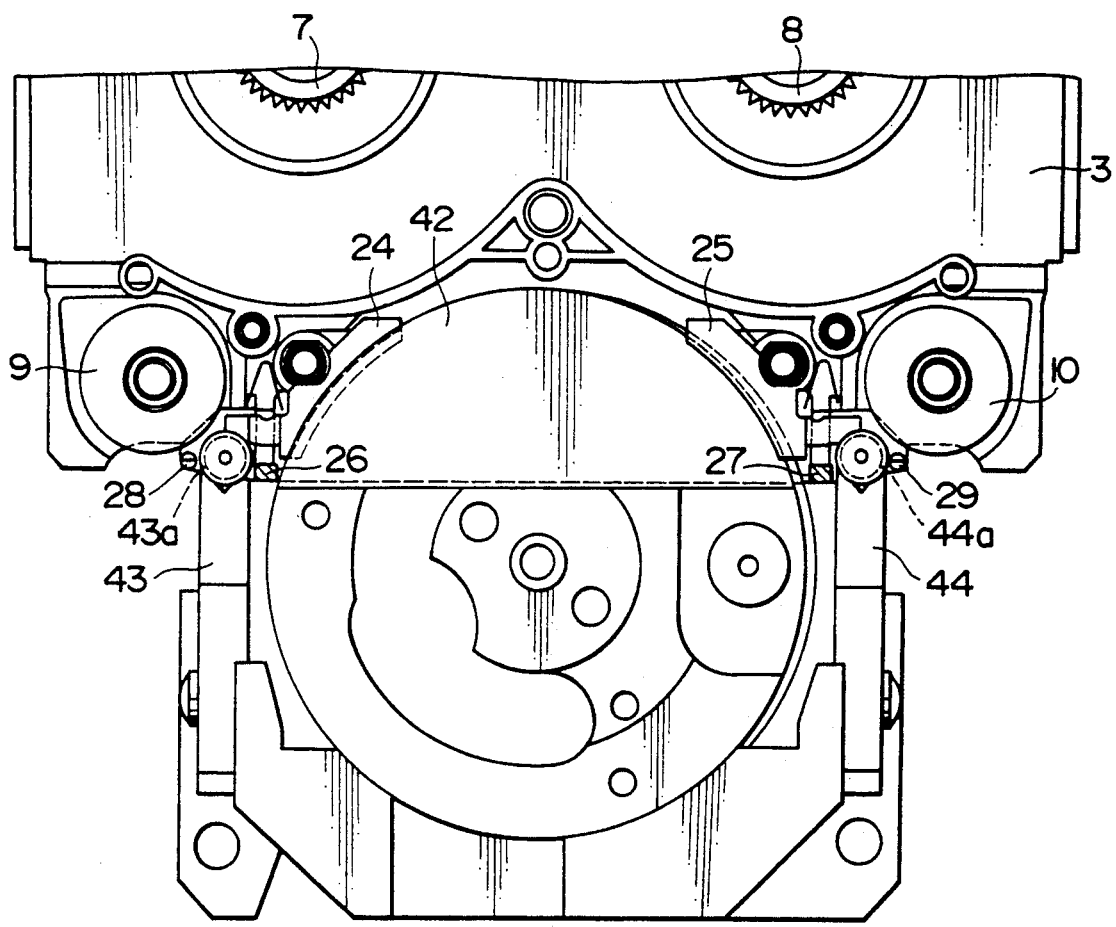
FIG. 10 is a plan view of the tape cassette of the present invention and the head drum inserted in the former.

Referring to FIGS. 8 to 10, the tape cassette 1 consists of a case body for containing a magnetic tape T for recording, for example, PCM signals thereon, and constructed by fastening an upper half case 2 and a lower half case 3 together with screws 4, and a lid 6 pivotally joined to the case body so as to cover a front opening 5 formed in the front side of the case body.

As shown in FIGS. 8 and 9, a pair of spools 7 and 8 are disposed within the case body of the tape cassette 1, namely, within a space defined by the upper half case 2 and the lower half case 3, at positions corresponding to holes 2a and 2b (and 3a and 3b) for receiving spool driving shafts, respectively, and the magnetic tape T is wound on the spools 7 and 8. A portion of the magnetic tape T is extended tautly between pinch rollers 9 and 10 serving also as guide rollers disposed on the opposite sides of the front opening 5 so as to be exposed through the front opening 5.

Erase disable mechanisms 12 and 13 for preventing accidental erase of signals recorded on the magnetic tape T are formed on the opposite ends of the back side of the case body of the tape cassette 1 across the upper half case 2 and the lower half case 3. Positioning holes 14 and 15 are formed at positions near the front side and back side, respectively, of the middle portion of the case body in each of the upper and lower walls of the case body, and positioning holes 16 and 17 are formed at the opposite ends, respectively, of the back portion near the back side of the case body in each of the upper and lower walls of the cassette. A plurality of detection holes 18 and 19 are formed in the case body along the back side of the same. Gripping portions 20 and 21 are formed in the rear portions of the opposite side surfaces of the case body of the tape cassette 1.

The lid 6 for closing the front opening 5 of the case body is provided in its front surface with a longitudinal guide groove 22, and recesses 23 for a changer.

Windows 2c and 3c of a transparent resin are formed in the central portions of the upper wall of the upper half case 2 and the lower wall of the lower half case 3, respectively, to enable the recognition of the amount of the magnetic tape T on the spools 7 and 8 from outside the case body of the tape cassette 1.

When the tape cassette 1 is loaded on a recording/reproducing apparatus, the magnetic tape T contained in the case body is subjected to the helical scanning operation of a rotary head for recording or reproducing operation.

As shown in FIG. 9, a rotary head 41 rotates about an axis inclined at a predetermined angle to the axis of a head drum 42. When the head drum 42 is received partially in the tape cassette 1 through the front opening 5 opened by turning the lid 6 of the case body of the tape cassette 1 upward or downward, the magnetic tape T extending along the front opening 5 winds around a portion of the circumference of the head drum 42 exposed within the tape cassette 1. When the rotary head 41 is rotated, inclined tracks obliquely extending across the magnetic tape T are formed on the magnetic tape T.

In this embodiment, a pair of tape guide members 24 and 25 inclined respectively in opposite directions are disposed in the space for receiving a portion of the head drum 42 so as to be able to swing and to move laterally respectively on the inner sides of the pinch rollers 9 and 10 to ensure that the magnetic tape T slides helically along the head drum 42. Therefore, when the head drum 42 is inserted through the front opening 5 in the tape cassette 1, the tape guide members 24 and 25 are in contact with the circumference of the head drum 42 as shown in FIG. 10 to guide the magnetic tape T by holding the magnetic tape T on the circumference of the head drum 42.

The head drum 42 is provided on its opposite sides with wing guides 43 and 44 respectively supporting rollers 43a and 44a to be inserted between the pinch roller 9 and the tape guide 24 and between the pinch roller 10 and the tape guide 25, respectively. The magnetic tape T is pressed against the tape guide members 24 and 25 with the rollers 43a and 44a.

The wing guide 43 (44) is inserted through the front opening 5 in the case body of the tape cassette 1 and is positioned between a support member 26 (27) and a guide 28 (29) disposed between the support member 26 (27) and the pinch roller 9 (10).

Figure 2:
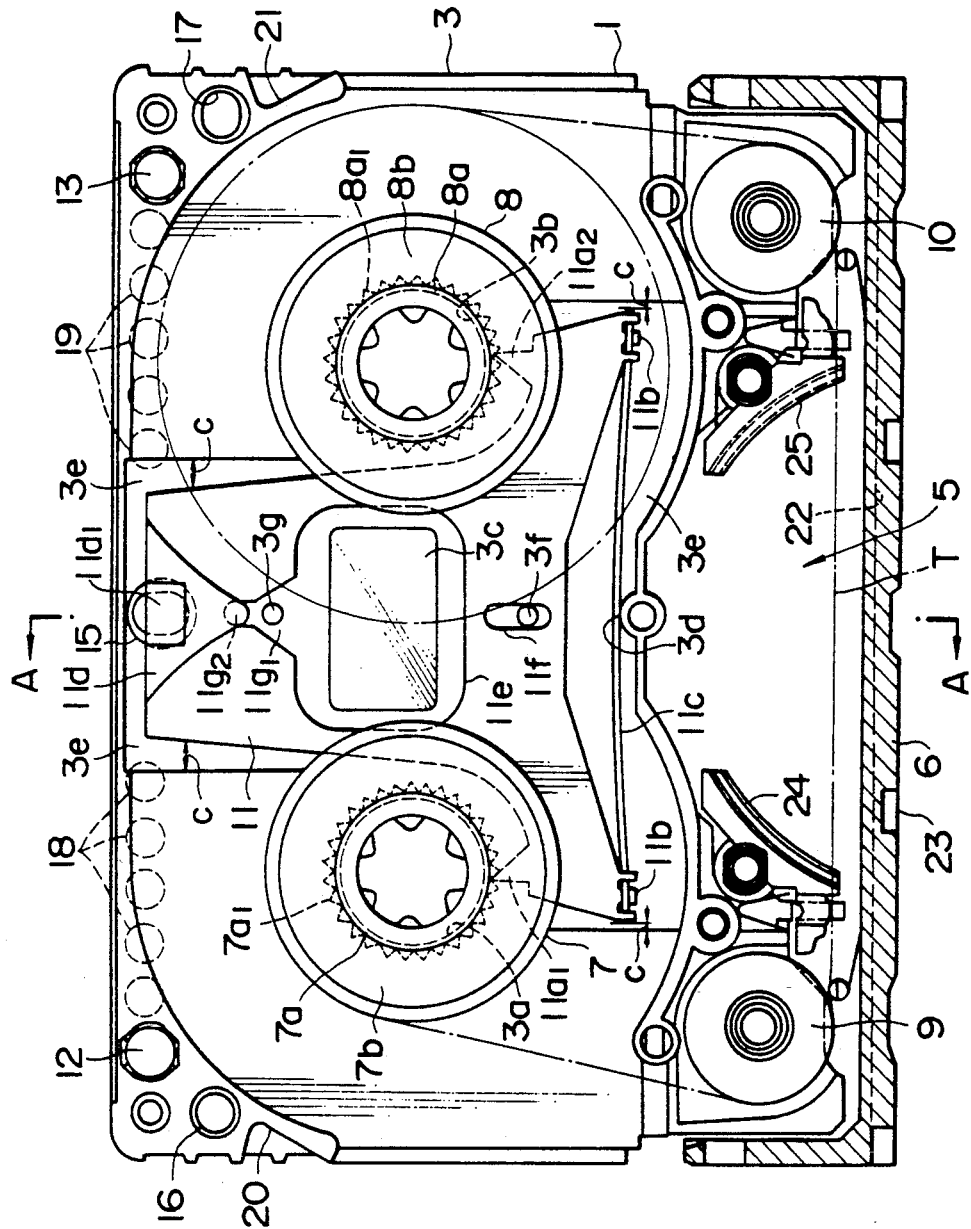
FIG. 2 is a plan view of a tape cassette in the first embodiment in a locked state.
Figure 3:
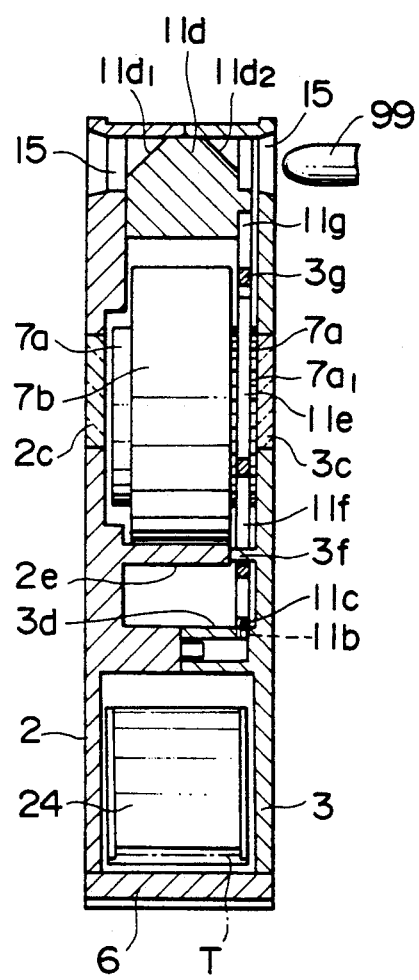
FIG. 3 is a sectional view taken on line A—A in FIG. 2.

As shown in FIG. 2 and FIG. 3, which is a sectional view taken on line A—A in FIG. 2, the spool 7 (8) consists of an inner spool 7a (8a) that engages the spool driving shaft, and an outer spool 7b (8b) put on the inner spool 7a (8a) for axial movement thereon and restrained from rotation relative to the inner spool 7a (8a). The inner spool 7a (8a) has toothed portion $7a_1$ ($8a_1$) extending from the radial surface of the outer spool 7b (8b) toward the lower half case 3 and provided in its circumference with teeth.

The tape cassette 1 is provided with a locking member 11 that engages the toothed portion $7a_1$ and $8a_1$ of the spools 7 and 8 to lock the spools 7 and 8 while the tape cassette 1 is not in use. When the tape cassette 1 is loaded on the recording/reproducing apparatus, a positioning pin 99, which serves also as an unlocking pin, is received through the positioning hole 15 into the case body and shifts the locking member 11 in an unlocking direction to release the spools 7 and 8. The locking member 11 is placed in a recess 3e formed in the lower half case 3.

The locking member 11 provided within the case body of the tape cassette 1 and the spool locking action of the same will be described hereinafter with reference to FIGS. 1 to 7. FIGS. 1(a), 1(b), 1(c) and 1(d) are a front view, a sectional view taken on line B—B, a back view and a bottom view, respectively, of the locking member 11.

Figure 1A:
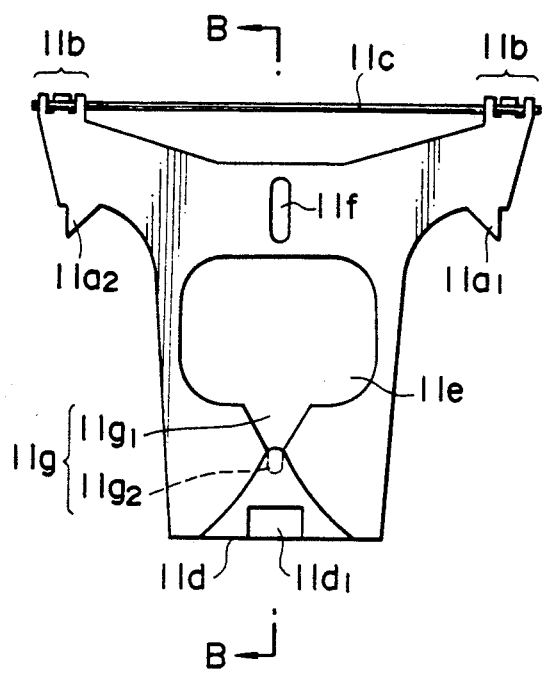
FIGS. 1(a), 1(b), 1(c) and 1(d) are a front view, a sectional view taken on line B—B, a back view and a bottom view, respectively, of a locking member employed in a first embodiment.
Figure 1B:
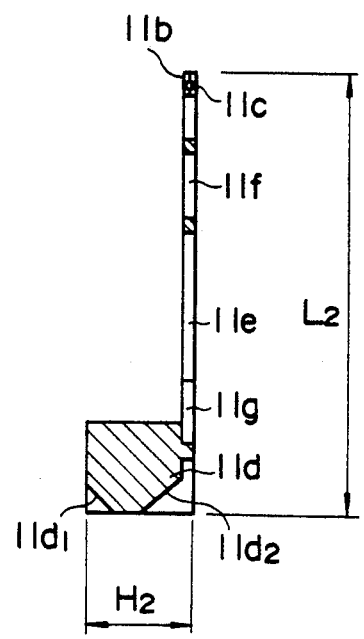
Figure 1C:
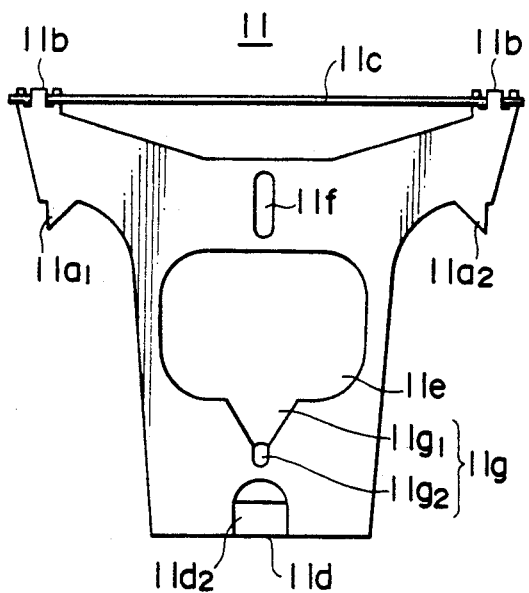
Figure 1D:
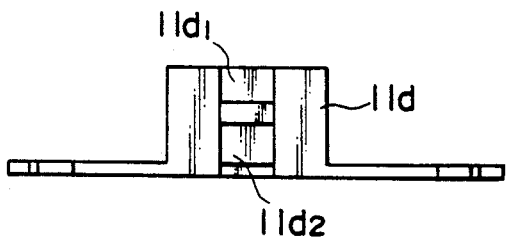

The locking member 11 has locking fingers $11a_1$ and $11a_2$ which engage the toothed portions $7a_1$ and $8a_1$ of the inner spools 7a and 8a to lock the spools 7 and 8, spring holding portions 11b provided with holding lugs formed in a zigzag arrangement to hold a locking spring 11c fixedly, such as a stainless steel wire, with lugs, and a cam portion 11d having inclined surfaces $11d_1$ and $11d_2$ descending in opposite directions with respect to the direction of the thickness of the case body of the tape cassette 1 as shown in FIG. 1(b).

The locking member 11 is provided in its central portion corresponding to the windows 2c and 3c of the half cases 2 and 3 with an opening 11e. The opening 11e is formed in a size that leaves the windows 2c and 3c open regardless of the position of the locking member 11.

A guide pin 3f projecting from the bottom wall of the lower half case 3 is set in a guide slot 11f formed in the locking member 11 to guide the locking member for movement between a locked position and an unlocked position and to restrain the locking member 11 from lateral movement.

As shown in FIG. 3, a holding finger 2e projecting from the inner surface of the upper wall of the upper half case 2 toward the lower half case 3 is in contact with the upper end of the guide pin 3f to prevent the locking member 11 from falling off the guide pin 3f.

The locking member 11 has a guide slot 11g consisting of the taper portion $11g_1$ and a U-shaped portion $11g_2$ connected to the taper portion $11g_1$. A guide pin 3g projecting from the bottom wall of the lower half case 3 is received in the guide slot 11g. The guide pin 3g engages the U-shaped portion $11g_2$ to restrain the locking member 11 from lateral movement.

The locking member 11 is formed, in view of resistance to abrasion by the positioning pin 99 (a metal pin, such as a stainless steel pin) of the recording/reproducing apparatus and sliding along the inner surface of the bottom wall of the lower half case 3, of an engineering plastic, such as POM.

The sliding action of the locking member 11 for locking and unlocking the spools 7 and 8 will be described with reference to FIGS. 2, 4 and 5.

Figure 4:
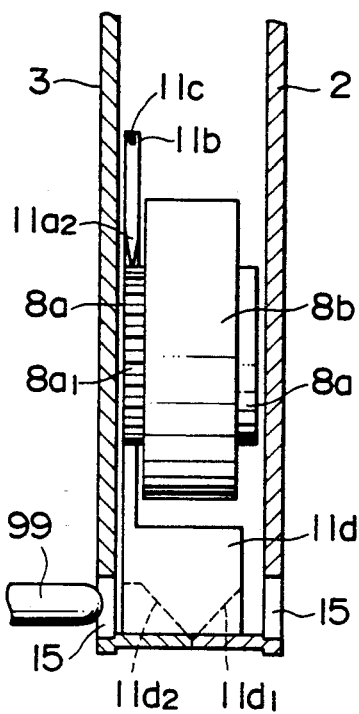
FIG. 4 is a fragmentary sectional view of the tape cassette of FIG. 2 in a locked state.

In the normal state, namely, when not in use, the locking fingers $11a_1$ and $11a_2$ are held in engagement with the toothed portions $7a_1$ and $8a_1$ of the inner spools 7a and 8a as shown in FIGS. 2 and 4 to lock the spools 7 and 8 by the resilience of the locking spring 11c strained by a projection 3d of the case body of the tape cassette 1.

Figure 5:
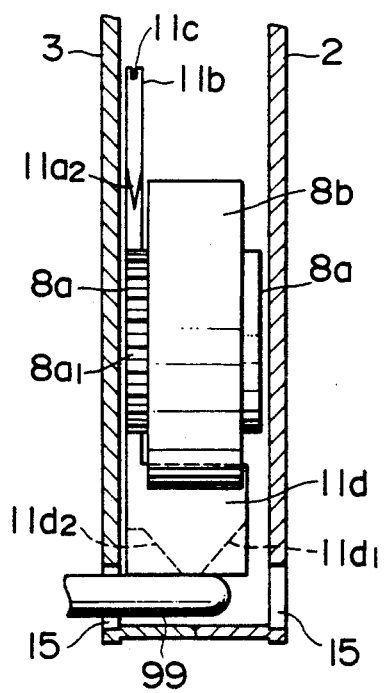
FIG. 5 is a fragmentary sectional view of the tape cassette of FIG. 2 in an unlocked state.

When the tape cassette 1 is loaded on the recording/reproducing apparatus, the positioning pin 99 is received through either of the positioning holes 15 of the upper half case 2 or the lower half case 3 into the case body to locate the tape cassette 1 in the recording/reproducing apparatus and to unlock the spools 7 and 8 as shown in FIG. 5.

Figure 6:
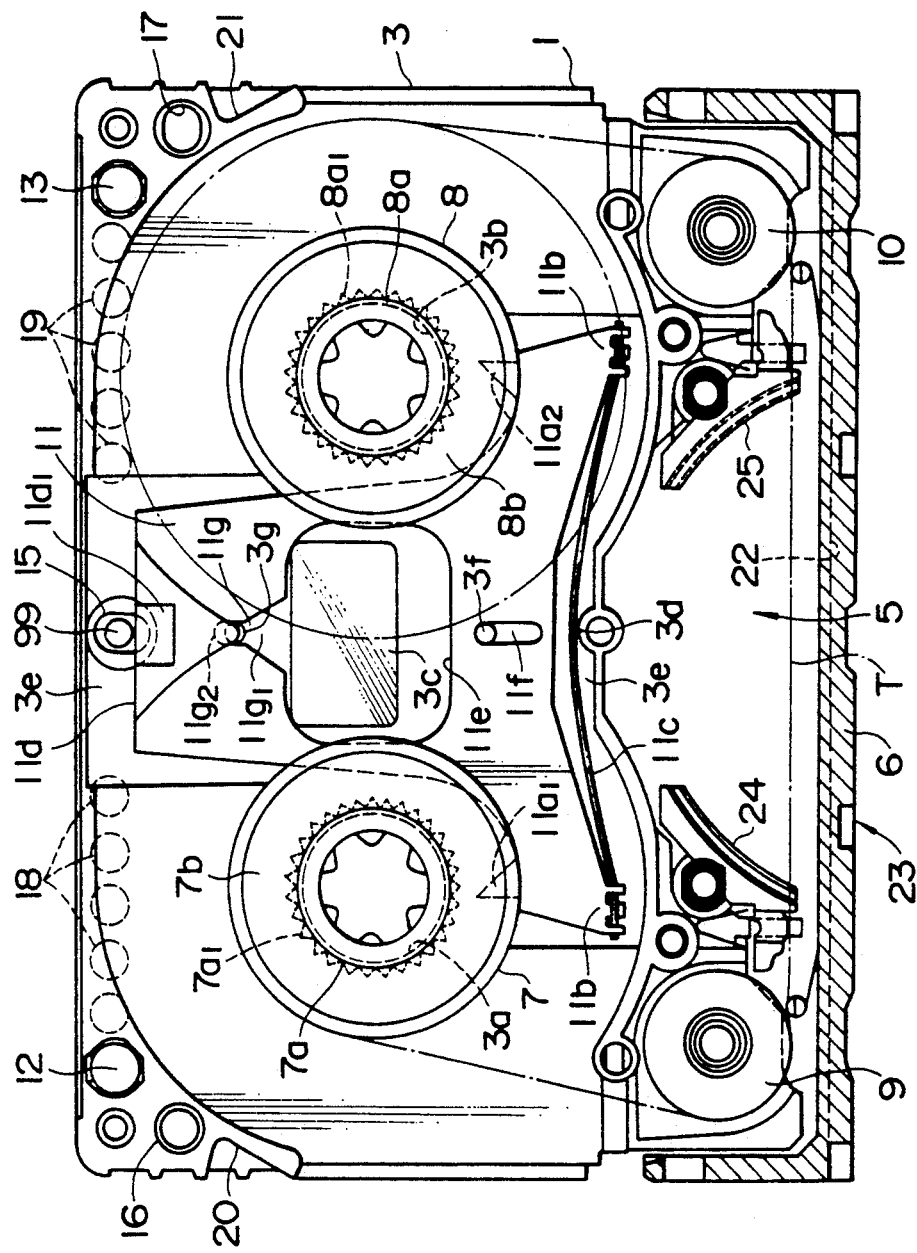
FIG. 6 is a plan view of the tape cassette of FIG. 2 in an unlocked state.

Since the inclined surfaces $11d_1$ and $11d_2$ descend respectively in opposite directions with respect to the direction of extension of the axes of the positioning holes 15 of the half cases 2 and 3 to form a V-shaped surface, the locking member 11 is moved against the resilience of the locking spring 11c toward the front side of the tape cassette 1 by the positioning pin 99 engaging either the inclined surface $11d_1$ or $11d_2$ of the cam portion 11d of the locking member 11 to an unlocking position shown in FIGS. 5 and 6. This movement of the locking member 11 is guided by the guide pin 3f received in the guide slot 11f. Consequently, the locking fingers $11a_1$ and $11a_2$ are separated from the toothed portions $7a_1$ and $8a_1$ to enable the spools 7 and 8 to rotate.

When the tape cassette 1 set in a locked state by the locking member 11 as shown in FIG. 2 is loaded on the recording/reproducing apparatus, the locking member 11 is moved in the foregoing manner to set the tape cassette 1 in an unlocked state as shown in FIG. 6. When the tape cassette 1 is ejected from the recording/reproducing apparatus and the positioning pin 99 slips out of the positioning hole 15, the locking member 11 is returned to the locking position as shown in FIG. 2 to lock the spools 7 and 8.

In the locked state shown in FIG. 2, the guide pin 3g projecting from the inner surface of the bottom wall of the lower half case 3 is outside the U-shaped portion $11g_2$ of the guide slot 11g. When the locking member 11 is moved to the unlocked position, the guide pin 3g drops into the U-shaped portion $11g_2$. The locking member 11 at the locked position is restrained from lateral movement only by the guide pin 3f engaging the guide slot 11f, while the locking member 11 at the unlocked position is restrained from lateral movement by both the guide pin 3f engaging the guide slot 11f and the guide pin 3g received in the U-shaped portion $11g_2$ of the guide slot 11g. Accordingly, the locked member 11 set at the locked position is able to rotate slightly on the guide pin 3f to enable the locking fingers $11a_1$ and $11a_2$ to engage the inner spools 7a and 8a properly. In moving the locked member 11 from the locking position to the unlocked position and vise versa, the locking member 11 is translated because the locking member 11 is restrained from lateral movement by both the guide pins 3f and 3g. To enable the locking member 11 to turn slightly in locking the spools 7 and 8, a clearance C is formed between the locking member 11 and the walls defining the recess 3e of the lower half case 3.

The locking fingers $11a_1$ and $11a_2$ of the locking member 11 engage the toothed portions $7a_1$ and $8a_1$ of the inner spools 7a and 8a at positions on the outer sides of the diameters of the spools 7 and 8 parallel to a line passing the respective centers of the guide pins 3f and 3g, respectively.

In this embodiment, the locking spring 11c is strained slightly in a gentle convex shape protruding toward the back side of the tape cassette 1 by the projection 3d in the locked state as shown in FIG. 2. Thus, the locking member 11 is urged continuously toward the back side of the tape cassette 1.

The spool locking mechanism of the tape cassette 1 in this embodiment is thus constructed so that the locking fingers $11a_1$ and $11a_2$ biased toward the back side of the tape cassette 1 so as to engage the toothed portions $7a_1$ and $8a_1$ of the inner spools 7a and 8a are separated from the toothed portions $7a_1$ and $8a_1$ to unlock the spools 7 and 8 by pushing the locking member 11 toward the front side of the tape cassette 1 with the positioning pin 99 received into the tape cassette 1 through the positioning hole 15 formed near the back side of the tape cassette 1.

The positioning pin 99 received through the positioning hole 15 into the tape cassette 1 shifts the locking member toward the front side of the tape cassette 1 in unlocking the spools 7 and 8. This shifting direction is reverse to the direction in which the locking member of the conventional tape cassette is shifted. Therefore, any space for the movement of the locking member 11 toward the back side of the tape cassette 1 need not be formed between the positioning hole 15 and the back side of the tape cassette 1, and hence the positioning hole 15 may be contiguous with the back side of the tape cassette 1. Accordingly, a wide area is available in each of the upper and lower surfaces of the tape cassette 1 for applying a label to the tape cassette 1, which is particularly effective when the tape cassette is a very small one.

Figure 7:
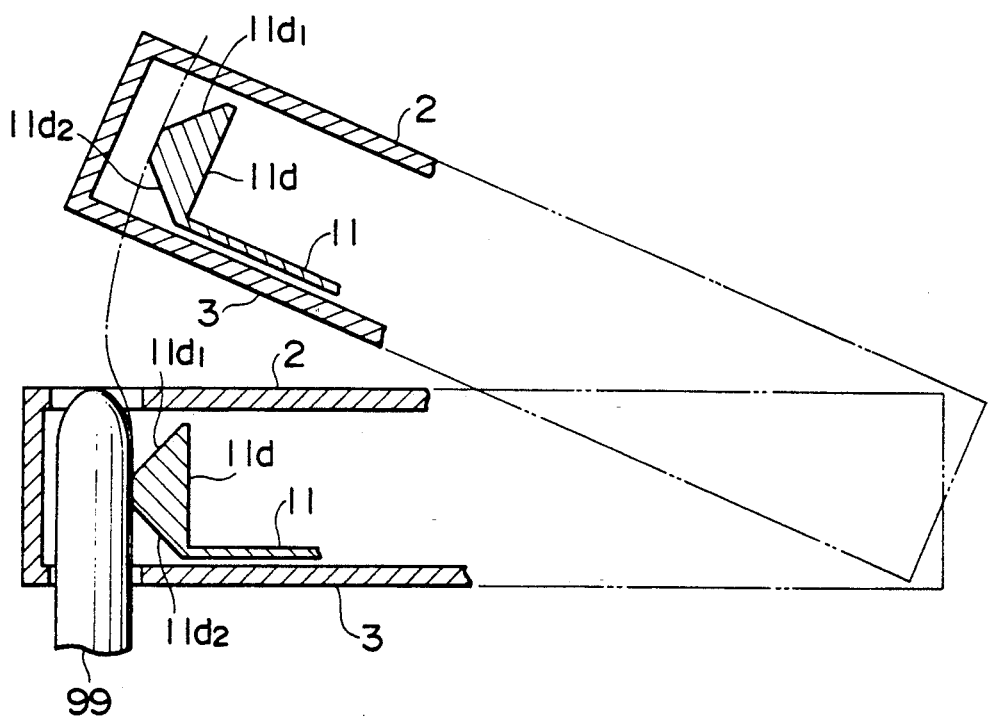
FIG. 7 is a schematic sectional view of assistance in explaining the action of the locking member in ejecting the tape cassette of FIG. 2 from a recording/reproducing apparatus.

In ejecting the tape cassette 1 from the recording/reproducing apparatus, the positioning pin 99 does not interfere with the movement of the apex of the cam portion 11, namely, the junction of the inclined surfaces $11d_1$ and $11d_2$, along a path indicated by an alternate long and short dash line in FIG. 7 and the locking member 11 is not moved toward the front side of the tape cassette 1 beyond the unlocked position. Accordingly, any unnecessary resistance obstructing the ejection of the tape cassette 1 does not act on the tape cassette 1 in separating the tape cassette 1 from the positioning pin 99.

The width $L_2$ (FIG. 1(b)) of the locking member 11, i.e., the dimension of the locking member 11 along the direction of movement of the locking member 11, is sufficiently long as compared with the height $H_2$ (FIG. 1(b)) of the locking member 11 corresponding to the thickness of the cam portion 11d. Therefore, the locking member 11 is never tilted from a vertical direction relative to the upper half case 2 and the lower half case 3, and hence the spool locking action and the spool unlocking action of the locking member 11 are never obstructed by undesirable friction between the locking member 11 and the lower half case 3.

In changing the tape cassette 1 from the unlocked state to the locked state by separating the same from the positioning pin 99, the locking member 11 is moved toward the back side of the tape cassette 1 and set at the locked position by the resilience of the locking spring 11c and, consequently, the spools 7 and 8 are dislocated slightly toward the back side by the pressure applied thereto by the locking member 1. Thus, the magnetic tape T is not slackened in locking the spools 7 and 8, because the spools 7 and 8 are shifted back, pulling the magnetic tape T.

As mentioned above, the locking member 11 is able to turn slightly on the guide pin 3f positioned nearer to the front side of the tape cassette 1 than the locking fingers $11a_1$ and $11a_2$ in locking the spools 7 and 8. Therefore, the locking fingers $11a_1$ and $11a_2$ are able to engage the corresponding inner spools 7a and 8a differentially; that is, the resilience of the locking spring 11c strained by the guide pin 3f is distributed properly to the point of engagement of the locking finger $11a_1$ and the toothed portion $7a_1$ of the inner spool 7a and the point of engagement of the locking finger $11a_2$ and the toothed portion $8a_1$ of the inner spool 8a on the opposite sides of the guide pin 3f. Accordingly, even if the locking member 11 is pushed laterally by one of the spools 7 and 8 turned in a direction to tighten the magnetic tape T by an external force, the locking finger engaging the other spool is never disengaged from the other spool. Therefore, the magnetic tape T is never unwound from one of the spools by an external force and is never caused to slacken.

Furthermore, although the center axis of the locking member 11 is not necessarily parallel to a line passing through the respective, centers of the guide pins 3f and 3g when the locked member 11 is held in the locking state, no problem arises in holding the locking member 11 at the unlocked position and in shifting the locking member 11, because the locking member 11 is restrained from lateral movement by the guide pin 3f engaging the guide slot 11f, and the guide pin 3g engaging the U-shaped, portion $11g_2$ when the locking member 11 is at the unlocked position.

Since the locking member 11 is held with its center axis parallel to the line passing through the centers of the guide pins 3f and 3g only when the same is at the unlocked position, and the locked fingers $11a_1$ and $11a_2$ function differentially, neither of the locking fingers $11a_1$ and $11a_2$ is disengaged from the toothed portion of the corresponding spool due to the difference in weight between the spools 7 and 8.

It is also possible to form guide pins on the locking member 11 and to form guide slots in the lower half case 3 as means for guiding the locking member 11 for sliding movement and for restraining the locking member 11 from lateral movement.

As stated above, since the locking member 11 is moved toward the front side of the tape cassette 1 in unlocking the spools 7 and 8, and pressure is applied continuously to the spools 7 and 8 so as to bias the spools 7 and 8 toward the back side of the tape cassette 1 by the locking member 11 in the locking state, the spools 7 and 8 are unable to move instantaneously toward the back side of the tape cassette 1 even if an impact acting toward the front side is applied to the tape cassette 1 and hence the spools 7 and 8 are not pulled for rotation by the magnetic tape T. Thus, the magnetic tape T is never unwound from the spools 7 and 8 and never caused to slacken by an impact acting on the back side of the tape cassette 1.

If the locking member 11 is formed for the foregoing advantages, so that the locking fingers $11a_1$ and $11a_2$ engaging the toothed portions $7a_1$ and $8a_1$ of the spools 7 and 8 on the side of the front side of the tape cassette 1 are disengaged from the toothed portions $7a_1$ and $8a_1$ of the spools 7 and 8 with the positioning pin 99 received into the tape cassette 1 through the positioning hole 15 formed near the back side of the tape cassette 1, the locking member 11 covers the window 3c of the lower half case 3. Therefore, the locking member 11 is provided with the opening 11e to enable the recognition of the amount of the magnetic tape T on the spools 7 and 8 through the window 3c of the lower half case 3.

Figure 11A:
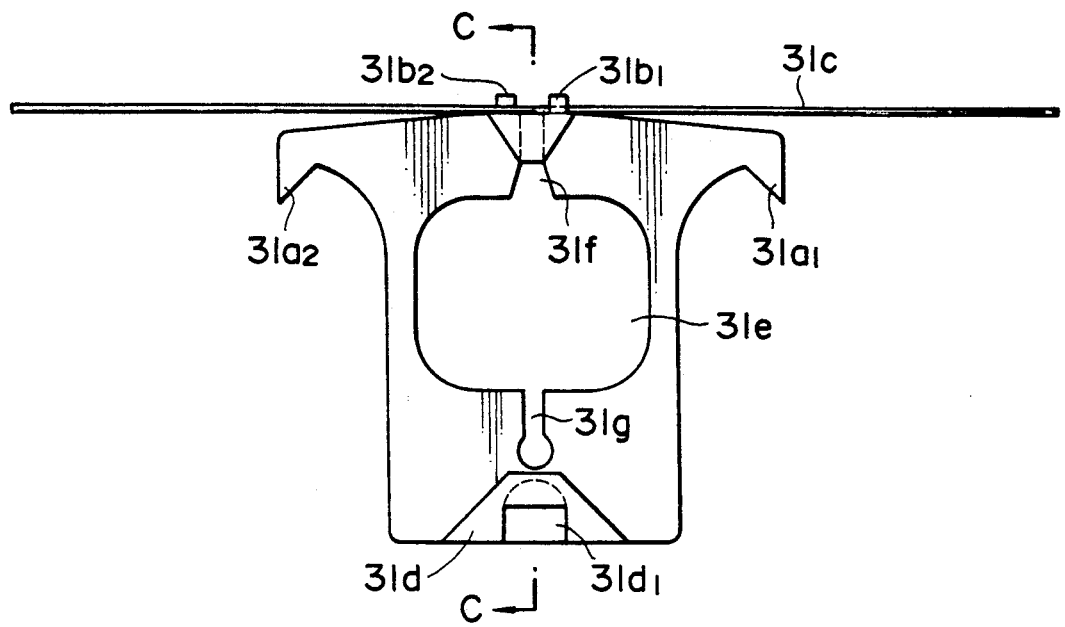
Figure 11B:
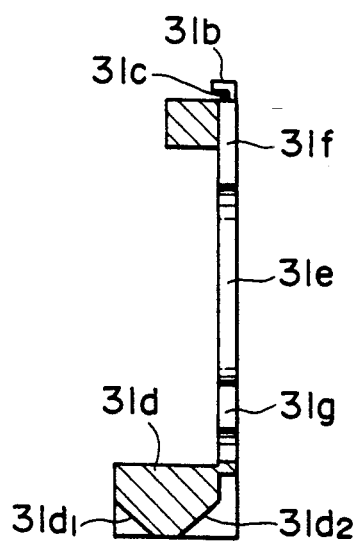
Figure 12:
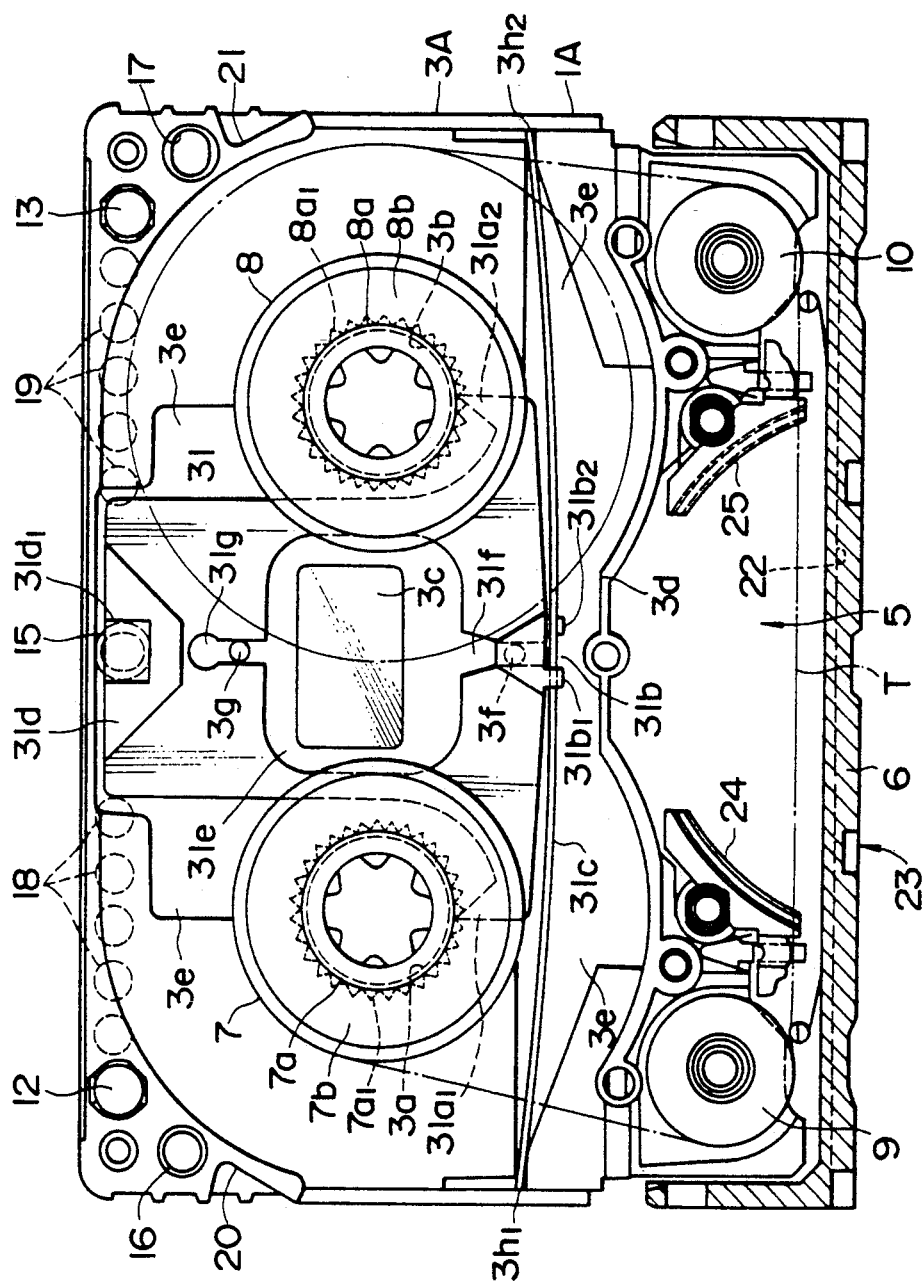
FIG. 12 is a plan view of a tape cassette in the second embodiment according to the present invention in a locked state.
Figure 13:
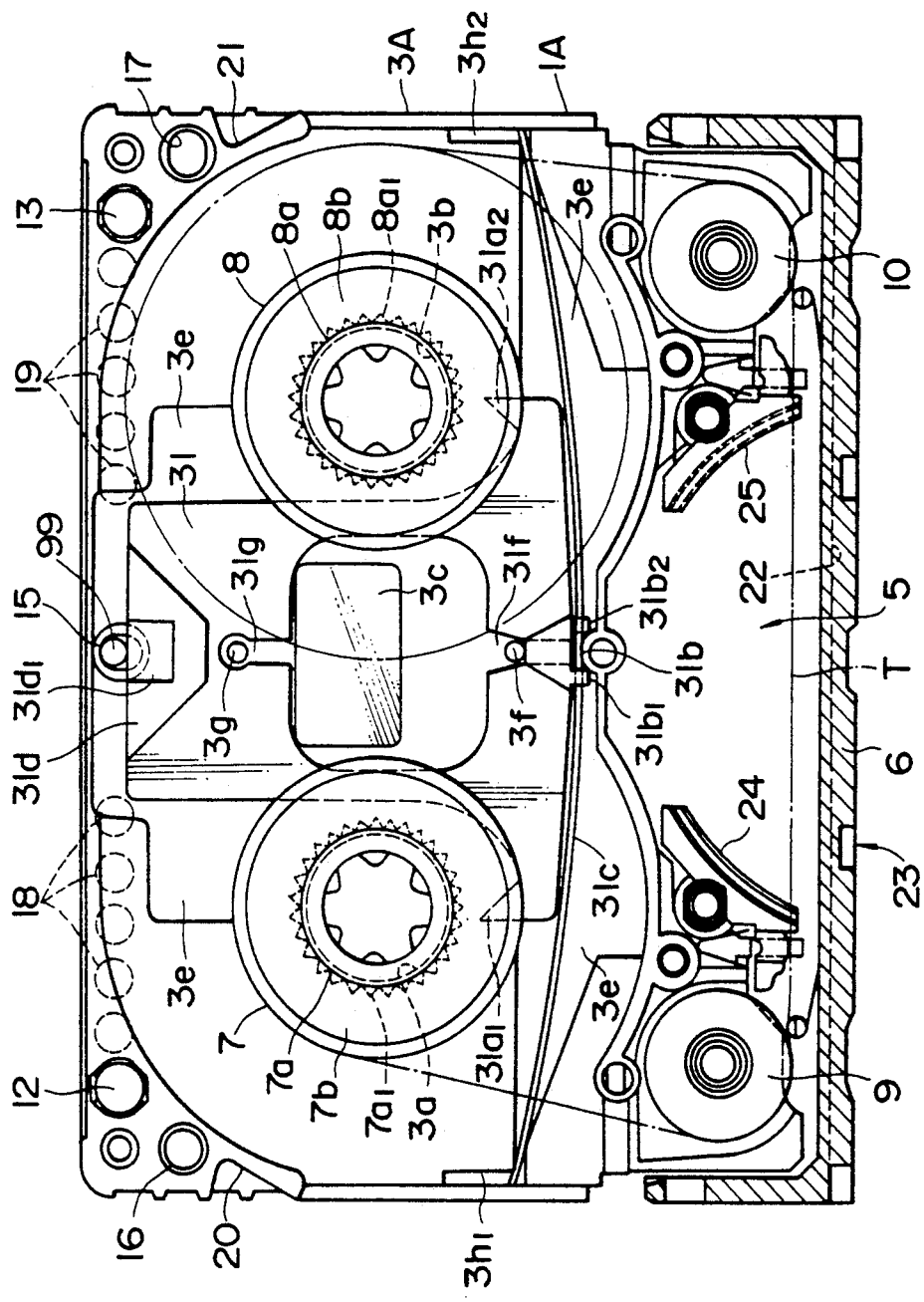
FIG. 13 is a plan view of the tape cassette of FIG. 12 in an unlocked state.
Figure 14A:
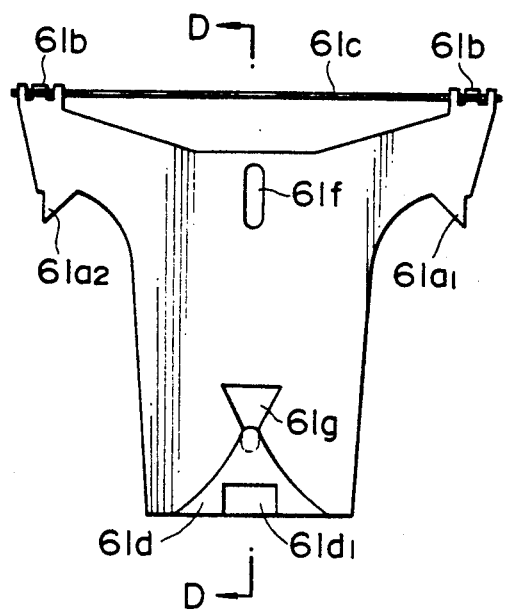
FIGS. 14(a), 14(b), 14(c) and 14(d) are a front view, a sectional view taken on line D—D, a back view and a bottom view, respectively, of a locking member employed in a tape cassette in a third embodiment according to the present invention.
Figure 14B:
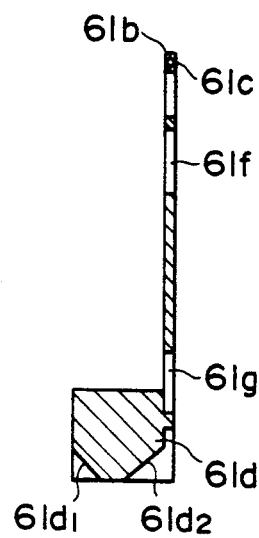
Figure 14C:
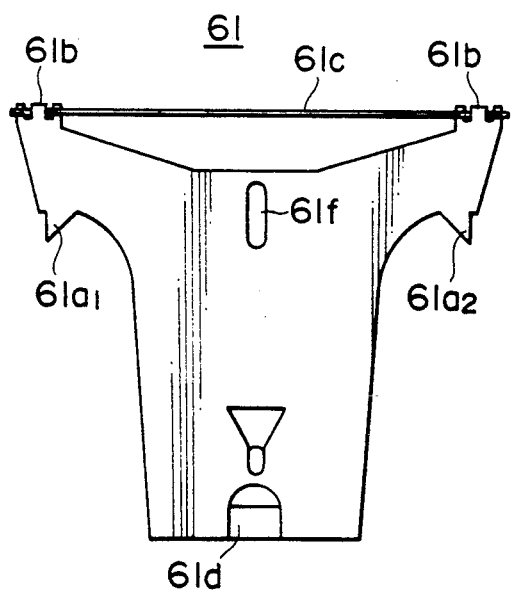
Figure 14D:
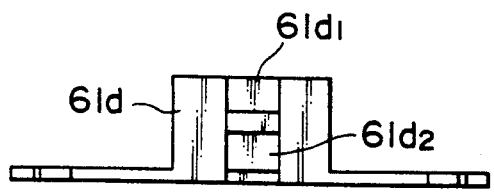

A tape cassette in a second embodiment according to the present invention will be described hereinafter with reference to FIGS. 11 to 13. FIGS. 11(a), 11(b), 11(c) and 11(d) are a front view, a sectional view taken on line C—C, a plan view and a bottom view, respectively, of a locking member 31 employed in the tape cassette 1A in the second embodiment according to the present invention, and FIGS. 12 and 13 are plan views of assistance in explaining the internal construction of the tape cassette 1A, in which parts like or corresponding to those shown in FIGS. 2 and 5 are denoted by the same reference characters.

The locking fingers $31a_1$ and $31a_2$ which engage the toothed portions $7a_1$ and $8a_1$ of the inner spools 7a and 8a of spools 7 and 8 to lock the spools 7 and 8, the cam portion 31d having inclined surfaces $31d_1$ and $31d_2$ descending in opposite directions to form a V-shaped surface with respect to the direction of thickness of the tape cassette 1A, and the opening 31e corresponding to windows 2c and 3c formed in an upper half case 2 and a lower half case 3A of the locking member 31 are substantially the same as those of the locking member 11 employed in the first embodiment. The lower half case 3A, similarly to the lower half case 3 of the first embodiment, is provided with guide pins 3f and 3g projecting from the inner surface of the bottom wall thereof, and the locking member 31, similar to the locking member 11 of the first embodiment, is provided with guide slots 31f and 31g respectively for receiving the guide pins 3f and 3g. The locking member 31 has only one spring holding portion 31b formed at the middle of the upper side, as viewed in FIGS. 11(a), thereof. The spring holding portion 31b has L-shaped lugs $31b_1$ and $31b_2$ fixedly holding a locking spring 31c, such as a stainless steel wire. The locking spring 31c extends laterally in opposite directions from the spring holding portion 31b beyond the opposite lateral ends of the locking member 11. The opposite ends of the locking spring 31c rest respectively on steps $3h_1$ and $3h_2$ formed on the lower half case 3A as shown in FIG. 12.

The locking spring 31c having the opposite ends resting on the steps $3h_1$ and $3h_2$ is strained convex toward the front side of the tape cassette 1A to bias the locking member 31 toward the back side of the tape cassette 1A. Therefore, in the normal state, namely, while the tape cassette 1A is not in use, the locking fingers $31a_1$ and $31a_2$ are in engagement with the toothed portions $7a_1$ and $8a_1$ of the inner spools 7a and 8a as show in FIG. 12 to lock the spools 7 and 8. When a positioning pin 99 is received through a positioning hole 15 into the tape cassette 1A and engages either the inclined surface $31d_1$ or $31d_2$, the locking member 31 is shifted to an unlocked position shown in FIG. 13 to unlock the spools 7 and 8. Such actions and effects of the locking member 31 are substantially the same as those of the locking member 11 of the first embodiment.

The employment of the locking springs 11c and 31c having the shape of a wire in the biasing means for biasing the locking members 11 and 31 toward the back side of the tape cassettes 1 and 1A enables the biasing means to be formed in a relatively small (thin) construction, which contributes to forming the tape cassettes 1 and 1A in a relatively small construction. The locking springs 11c and 31c having the shape of a relatively long, substantially straight wire are highly resistant to setting and durable to flexure.

In the locking state, the locked members 11 and 31 are positioned so that the locking springs 11c and 31c extend in a gentle curve, and the locking springs 11c and 31c are strained further in unlocking the spools. That is, the locking spring 11c employed in the first embodiment is strained continuously so as to extend in a convex curve protruding toward the back side of the tape cassette 1, and the locking spring 31c employed in the second embodiment is strained continuously so as to extend in a convex curve protruding toward the front side of the tape cassette 1A. Since the locking springs 11c and 31c are strained always in a fixed direction, the locking springs 11c and 31c neither bend back nor spring in putting the locking springs 11c and 31c in the case bodies of the tape cassettes 1 and 1A or in shifting the locking members 11 and 31. Furthermore, even if the locking springs 11c and 31c have a square cross section instead of a circular cross section or the same are flat springs, the locking springs 11c and 31c do not fall down. Accordingly, the locking members 11 and 31 can easily be put in the case bodies of the tape cassettes 1 and 1A, and the locking members 11 and 31 are able to slide stably.

Incidentally, the opening 11e (31e) formed in the locking member 11 (31) at a position corresponding to the window 3c of the lower half case 3 (3A) makes portions of the locking member 11 (31) extending on the opposite sides of the opening 11e (31e) thin, which is somewhat disadvantageous to the rigidity of the locking member 11 (31). Furthermore, the size, shape and position of the windows 3c (3c) of the upper half case 2 (2) and the lower half case 3 (3A) are dependent on the size, shape and position of the opening 11e (31e).

A tape cassette in a third embodiment according to the present invention will be described hereinafter. The tape cassette in the third embodiment is provided with a locking member 61 formed of a transparent material and provided with no opening corresponding to the window 3c of the lower half case 3. FIGS. 14(a), 14(b), 14(c) and 14(d) are a front view, a sectional view taken on line D—D, a back view and a bottom view, respectively, of the locking member 61. The locking member 61 has locking fingers 61$a_1$ and 61$a_2$, spring holding portions 61$b$ provided with holding lugs formed in a zigzag arrangement and fixedly holding a locking spring 61$c$, a cam portion 61$d$ having inclined surfaces 61$d_1$ and 61$d_2$, and guide slots 61$f$ and 61$g$. The construction and functions of the locking member 61 are the same as those of the locking member 11 shown in FIG. 1 and hence the description thereof will be omitted.

Formed a transparent material to omit the opening corresponding to the window 3$c$, the locking member 61 has a sufficiently high rigidity and enables the respective windows 2$c$ and 3$c$ of the upper half case 2 and the lower half case 3 to be formed in an optional size and an optional shape at an optional position.

A tape cassette in a fourth embodiment according to the present invention is provided with a locking member 71 capable of solving problems in the strength thereof and in the design of the windows 2$c$ and 3$c$. FIGS. 15($a$), 15($b$) and 15($c$) are a front view, a side view and a bottom view, respectively, of the locking member 71.

The locking member 71 has spring holding portions 71$b$ having lugs formed in a zigzag arrangement to hold a locking spring 71$c$, and a cam portion 71$d$ having inclined surfaces 71$d_1$ and 71$d_2$, which are similar to those of the locking member 11 employed in the first embodiment. The locking member 71 is different in shape from the locking member 11. The locking member 71 has lateral curved portions 71$h_1$ and 71$h_2$ bulging in opposite directions and defining a central opening 71$e$. Locking fingers 71$a_1$ and 71$a_2$ are formed on the inner side of a portion interconnecting the lateral curved portions 71$h/a$ and 71$h_2$. The locking member 71 is provided with guide slots 71$f$ and 71$g$ respectively for receiving guide pins 3$f$ and 3$g$ formed on a lower half case 3.

Figure 16:
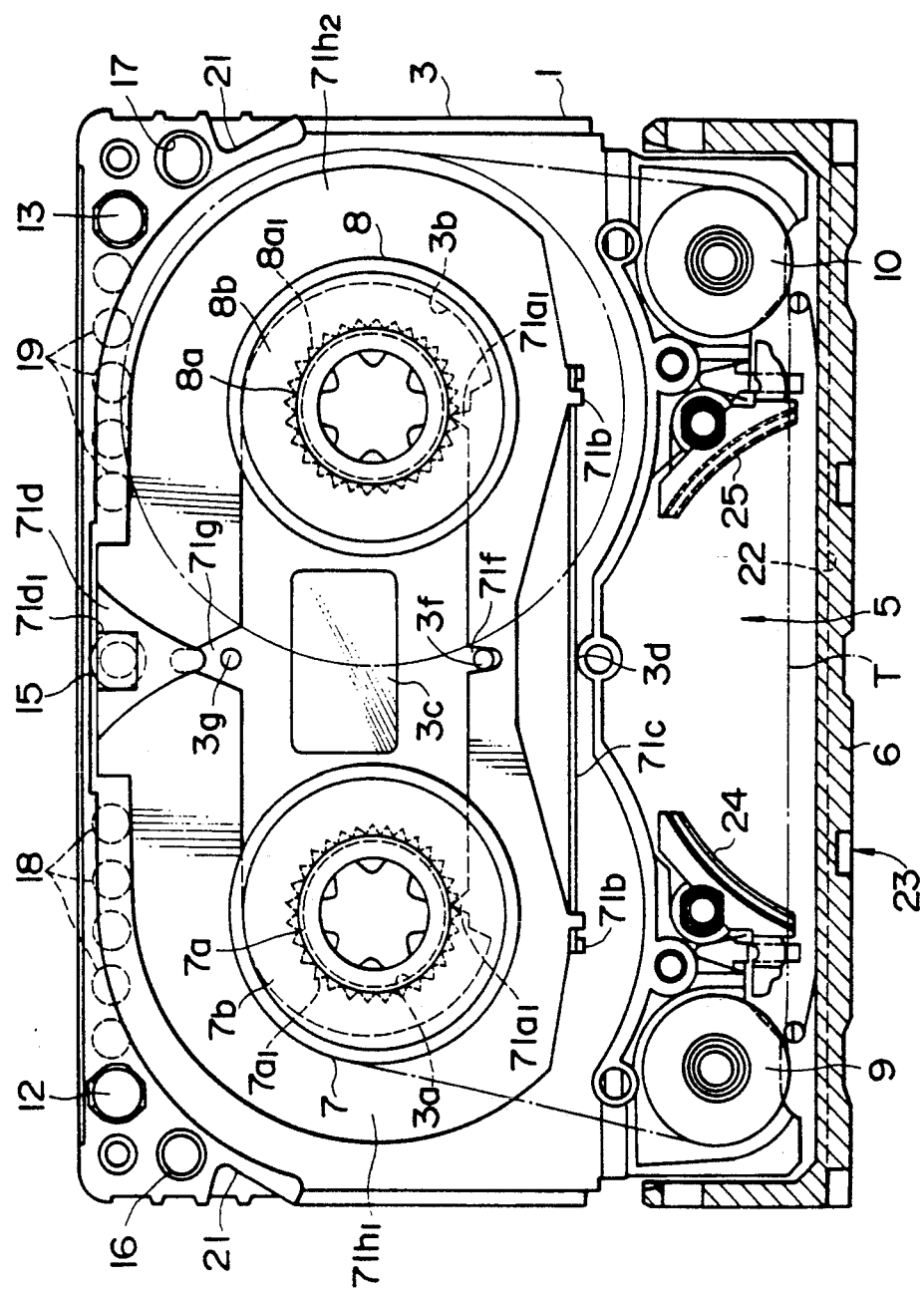
FIG. 16 is a plan view of a tape cassette in the fourth embodiment in accordance with the present invention in a locked state.
Figure 17:
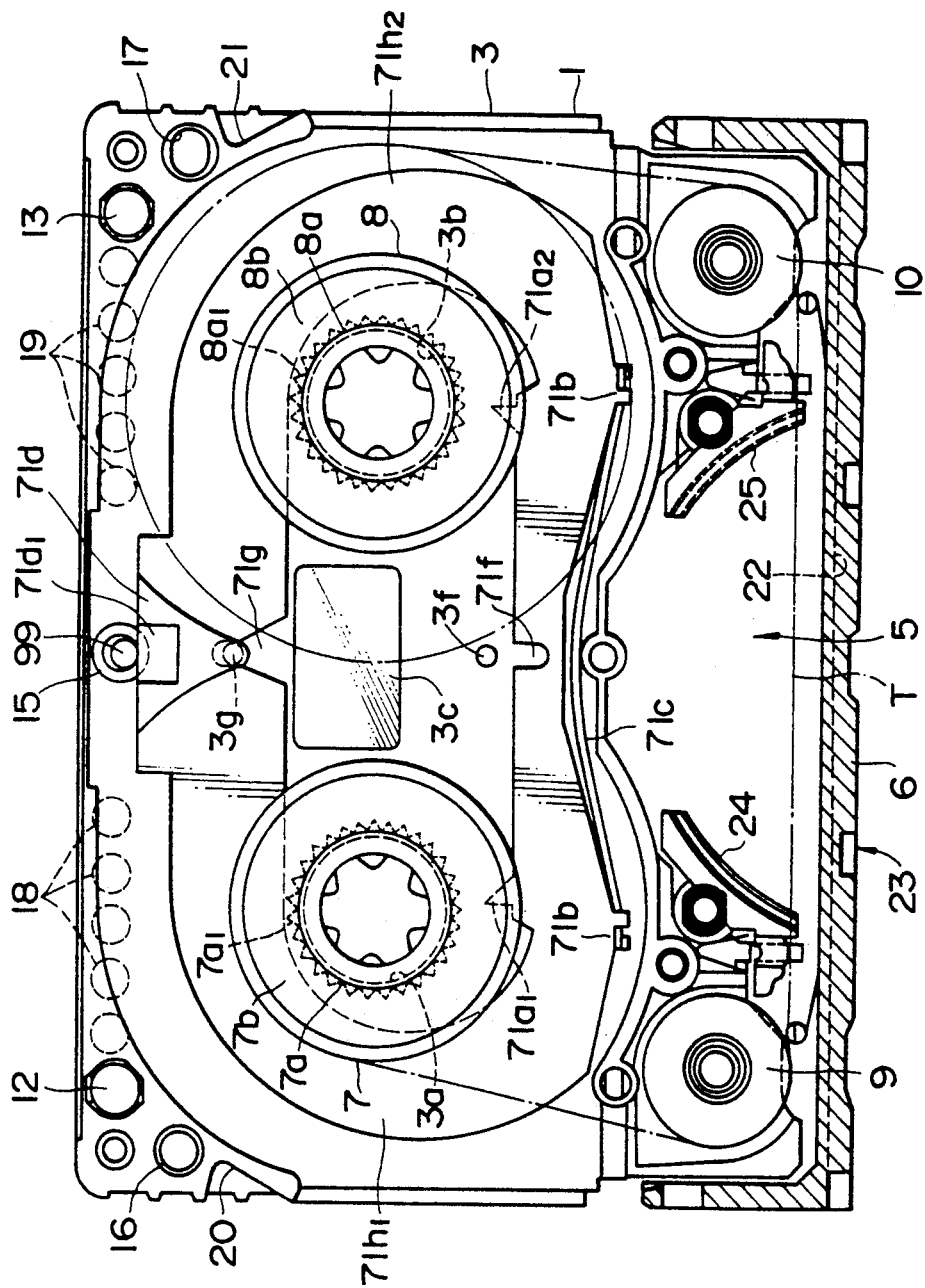
FIG. 17 is a plan view of the tape cassette of FIG. 16 in an unlocked state.
Figure 18:
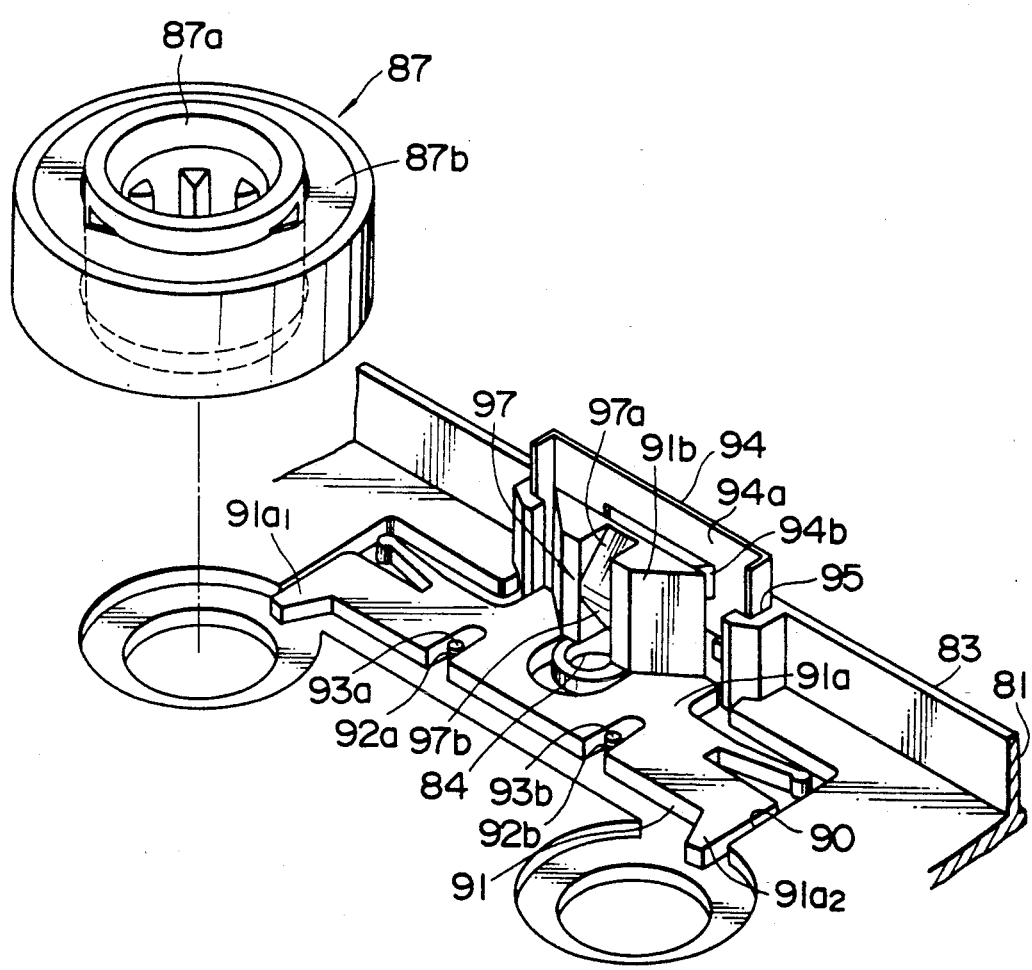
FIG. 18 is a perspective view of a spool locking mechanism employed in a conventional tape cassette.
Figure 19:
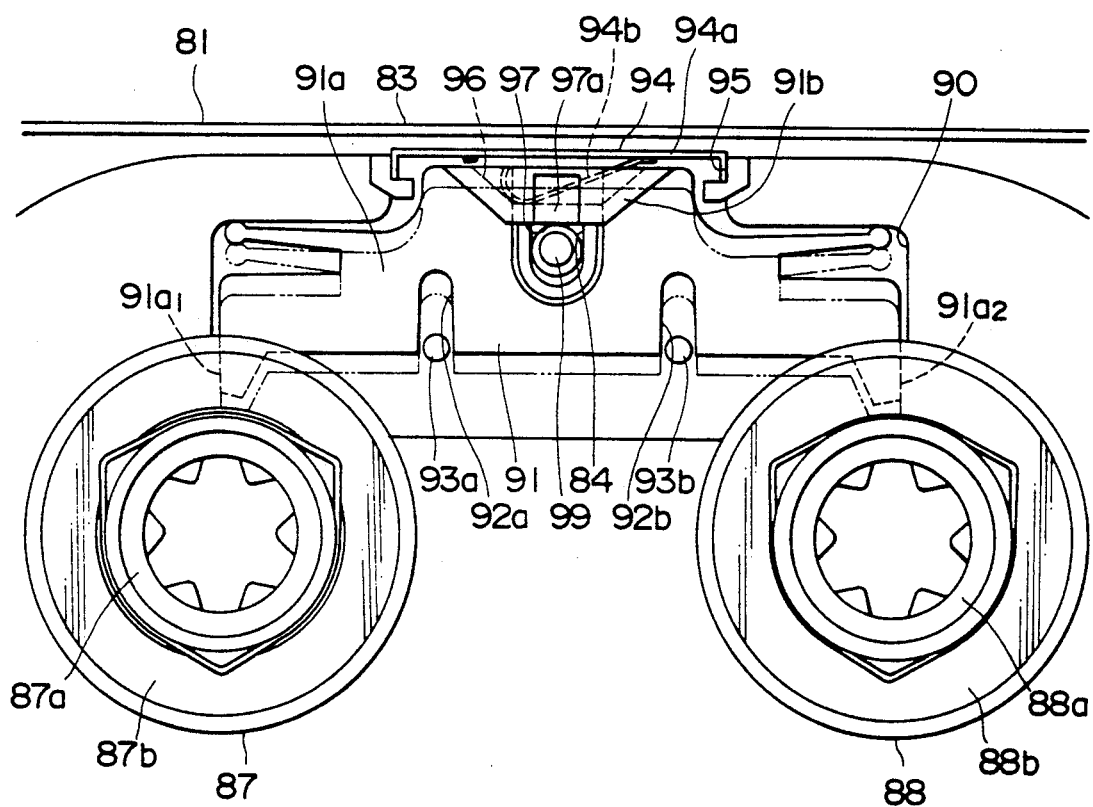
FIG. 19 is a plan view of the locking mechanism employed in the conventional tape cassette.
Figure 20A:
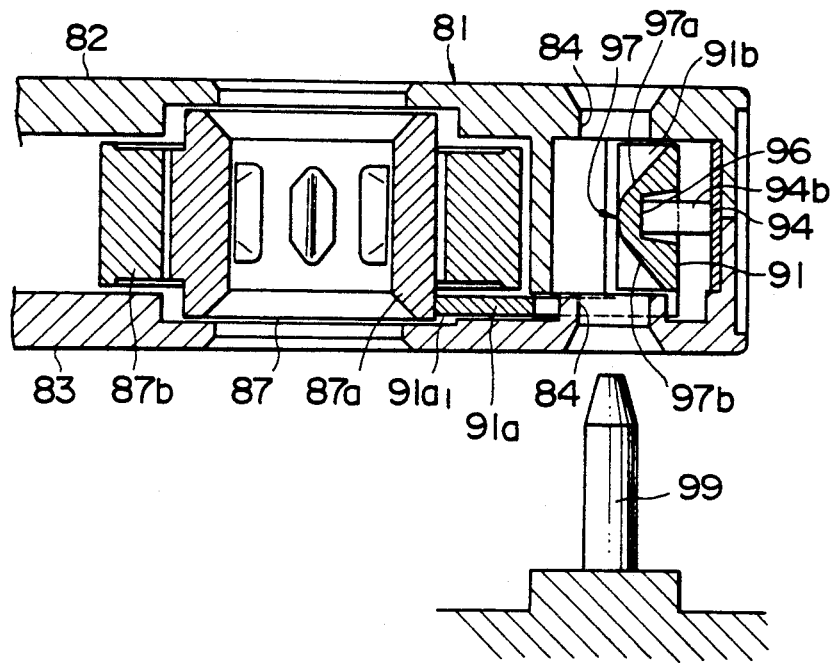
FIGS. 20(a) and 20(b) are sectional views of assistance in explaining the conventional spool locking mechanism.
Figure 20B:
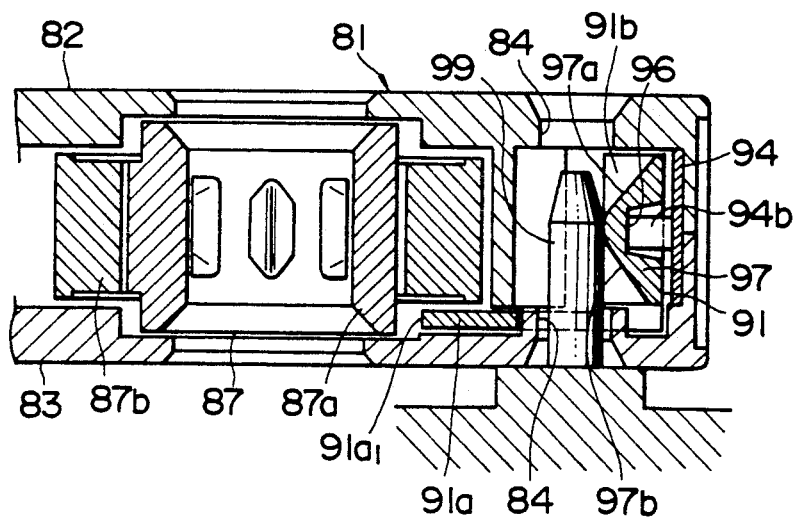
Figure 21:
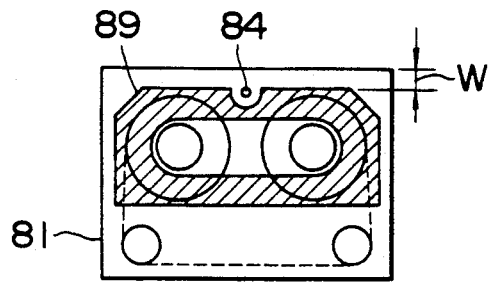
FIG. 21 is a plan view of a conventional tape cassette, showing an area available for applying a label to the tape cassette.
Figure 22:
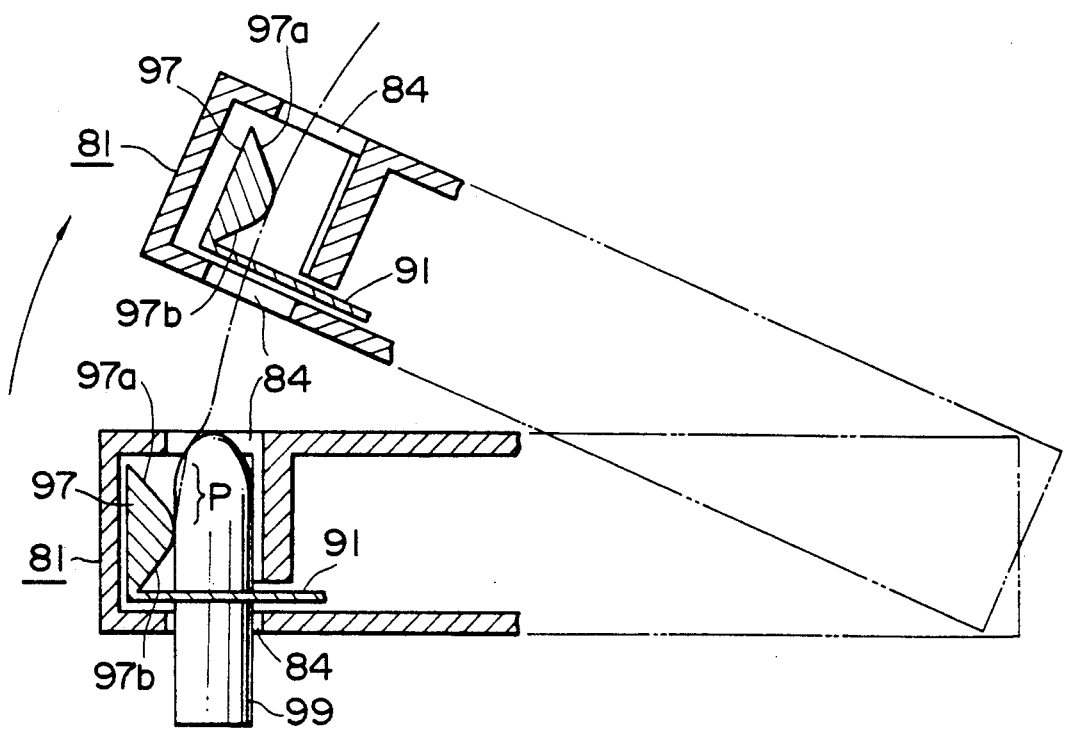
FIG. 22 is a sectional view of assistance in explaining the action of the locking mechanism in ejecting the conventional tape cassette from a recording/reproducing apparatus.
Figure 23A:
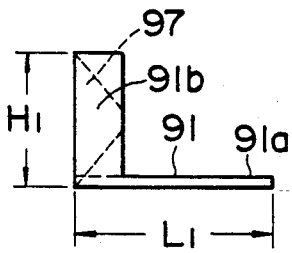
FIGS. 23(a), 23(b), and 23(c) are views of assistance in explaining the tilt of a locking member employed in the conventional tape cassette.
Figure 23B:
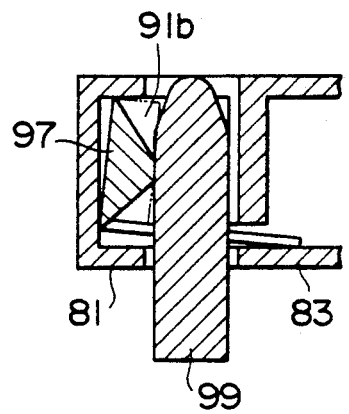
Figure 23C:
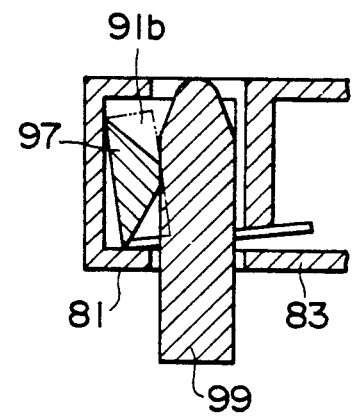
Figure 24:
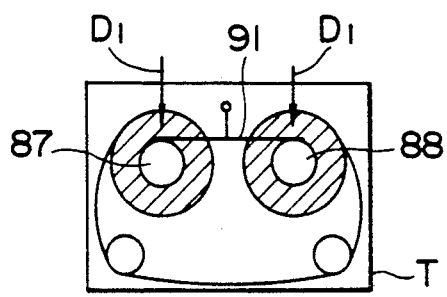
FIG. 24 is a plan view of assistance in explaining the slackening of the magnetic tape T in locking the spools of the conventional tape cassette.
Figure 25:
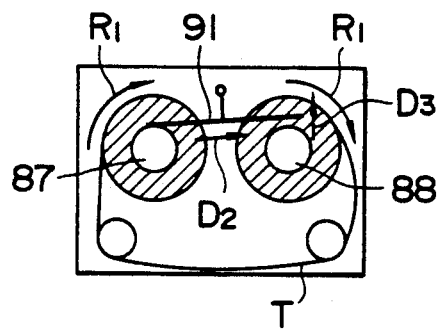
FIG. 25 is a plan view of assistance in explaining the slackening of the magnetic tape T due to an external force applied to the conventional tape cassette.
Figure 26A:
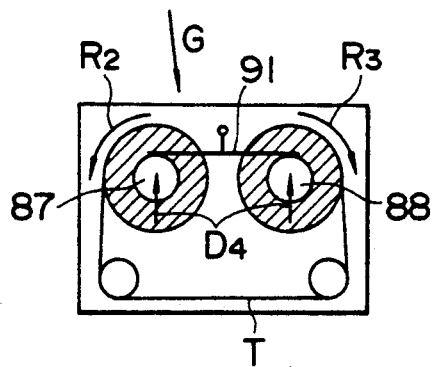
FIGS. 26(a) and 26(b) are plan views of assistance in explaining the slackening of the magnetic tape T due to an impact applied to the back side of the conventional tape cassette.
Figure 26B:
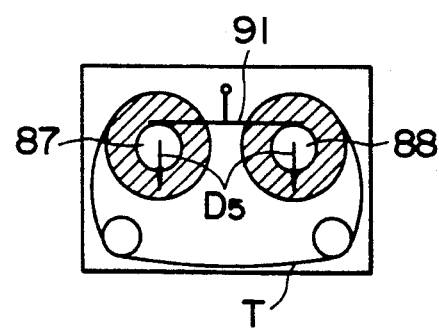

As shown in FIG. 16, the locking member 71 is placed in the lower half case 3 with the locking fingers 71$a_1$ and 71$a_2$ engaging the toothed portions 7$a_1$ and 8$a_1$ of the inner spools 7$a$ and 8$a$ of spools 7 and 8 to lock the spools 7 and 8. The locking member 71, similar to the locking member 11 employed in the first embodiment, is shifted to an unlocking position shown in FIG. 17 by a positioning pin 99 which engages either the inclined surface 71$d_1$ or 71$d_2$.

The rigidity of the locking member 71 employed in the fourth embodiment is higher than those of the locking members employed in the first and second embodiments. The shape of the locking member 71 enables the relatively optional determination of the size, shape and position of the windows 2$c$ and 3$c$ of the upper half case 2 and the lower half case 3.

Although the tape cassettes in the preferred embodiments in accordance with the present invention have been described, the shapes and the materials of the case bodies of the tape cassettes and the locking members are not limited to those described above, but may be determined selectively according to the size and purposes of the tape cassette.

As is apparent from the foregoing description, the tape cassette of the present invention has the locking member engaging a pair of spools on the front side so as to press the spools in a direction to pull the magnetic tape. Therefore, the magnetic tape does not slacken in locking the spools or when an impact is applied to the back side of the tape cassette. Since the dimension of the locking member along the direction of sliding movement of the locking member is sufficiently large as compared with the height of the cam portion, the locking member is able to slide smoothly without hindrance such as the tilting of the same.

Since the locking member is pushed toward the front side of the tape cassette in unlocking the spools, the hole for receiving the positioning pin serving also as an unlocking pin therethrough may be formed close to the back side of the tape cassette, which enables a large area for a label to be secured on the surfaces of the tape cassette and eliminates unnecessary friction between the positioning pin and the cam portion.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A tape cassette comprising:

a case body having an opening in a front side thereof, and consisting of an upper half case and a lower half case;

a pair of spools for winding a tape, supported for rotation within the case body, and provided respectively with circumferentially arranged toothed portions;

a locking member placed on an inner surface of a bottom wall of the lower half case within the case body for sliding toward and away from a back side of the case body, and provided with locking fingers for engagement respectively with the toothed portions at locations facing the front side of the case body; and spring means fastened to the locking member to bias the locking member toward the back side of the case body;

the locking member further comprising a cam portion having first and second inclined surfaces inclined in opposite directions and forming an apex facing the back side of the case body in a direction opposite an eject direction of the cassette, said first inclined surface facing said upper half case and said second inclined surface facing said lower half case;

one of the inclined surfaces of the cam portion of the locking member being arranged to engage a positioning pin of a recording/reproducing apparatus when the tape cassette is loaded on the recording/reproducing apparatus, so that the locking member is moved against a resilience of the spring means toward the front side of the case body by the positioning pin engaging one of the inclined surfaces of the cam portion in the eject direction when loading the tape cassette on the recording/reproducing apparatus, and the locking fingers are respectively disengaged from the toothed portions of the spools to unlock the spools, and the locking member is moved by the resilience of the spring means toward the back side of the case body as the positioning pin exits the case body when unloading the tape cassette, so that the locking fingers are brought into engagement with the toothed portions of the spools to lock the spools.

2. A tape cassette according to claim 1, wherein the locking member is provided with a central opening at a position corresponding to windows formed in the upper and lower half cases.

3. A tape cassette according to claim 1, wherein the spring means is formed of a wire, and said wire abuts a portion of said case body so as to bias the locking member toward the back side of the case body.

4. A tape cassette according to claim 1, wherein the locking member has a pair of substantially straight sections parallel to a line passing through the centers of said pair of spools and a pair of curved sections bulging laterally outward in opposite directions, respectively, and interconnecting the substantially straight sections, the locking finger being formed on an inner side of the one of the pair of substantially straight sections facing the front side of the cassette body, and the cam portion is formed on the other of the pair of substantially straight sections.

* * * * *